(12) United States Patent
Raichelgauz et al.

(10) Patent No.: US 11,003,706 B2
(45) Date of Patent: May 11, 2021

(54) SYSTEM AND METHODS FOR DETERMINING ACCESS PERMISSIONS ON PERSONALIZED CLUSTERS OF MULTIMEDIA CONTENT ELEMENTS

(71) Applicant: Cortica, Ltd., Tel Aviv (IL)

(72) Inventors: Igal Raichelgauz, Tel Aviv (IL); Karina Odinaev, Tel Aviv (IL); Yehoshua Y Zeevi, Haifa (IL)

(73) Assignee: CORTICA LTD, Tel Aviv (IL)

( * ) Notice: Subject to any disclaimer, the term of this patent is extended or adjusted under 35 U.S.C. 154(b) by 77 days.

(21) Appl. No.: 15/601,314

(22) Filed: May 22, 2017

(65) Prior Publication Data

US 2017/0255619 A1    Sep. 7, 2017

Related U.S. Application Data

(63) Continuation-in-part of application No. 15/452,148, filed on Mar. 7, 2017, and a continuation-in-part of
(Continued)

(30) Foreign Application Priority Data

Oct. 26, 2005  (IL) .......................................... 171577
Jan. 29, 2006  (IL) .......................................... 173409
Aug. 21, 2007  (IL) .......................................... 185414

(51) Int. Cl.
*G06F 17/30*  (2006.01)
*G06F 16/41*  (2019.01)
(Continued)

(52) U.S. Cl.
CPC ............ *G06F 16/41* (2019.01); *G06F 16/583* (2019.01); *G06F 21/604* (2013.01);
(Continued)

(58) Field of Classification Search
None
See application file for complete search history.

(56) References Cited

U.S. PATENT DOCUMENTS 4,733,353 A   3/1988  Jaswa
4,932,645 A   6/1990  Schorey et al.
(Continued)

FOREIGN PATENT DOCUMENTS

EP    1085464 A3   1/2007
WO    0231764      4/2002
(Continued)

OTHER PUBLICATIONS

Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
(Continued)

*Primary Examiner* — Hung D Le
(74) *Attorney, Agent, or Firm* — Oren Reches

(57) ABSTRACT

A method and system for determining access permissions to personalized clusters of multimedia content elements are provided. The method includes receiving a permission index designating at least the content description of at least one personalized cluster and an authentication factor; analyzing the content description; checking if there is at least one personalized cluster that matches the analyzed content description; and generating privacy metadata for each matching personalized cluster, wherein the privacy metadata includes at least the authentication factor associated with the respective content description matching the personalized cluster, wherein the generate privacy metadata determines access permission to the matching personalized cluster.

6 Claims, 8 Drawing Sheets

Related U.S. Application Data application No. 15/420,989, filed on Jan. 31, 2017, which is a continuation-in-part of application No. 14/509,558, filed on Oct. 8, 2014, now Pat. No. 9,575,969, which is a continuation of application No. 13/602,858, filed on Sep. 4, 2012, now Pat. No. 8,868,619, which is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, now Pat. No. 9,798,795, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009, now Pat. No. 9,798,795.

(60) Provisional application No. 62/340,709, filed on May 24, 2016, provisional application No. 62/307,517, filed on Mar. 13, 2016.

(51) Int. Cl.
*H04L 29/08* (2006.01)
*H04L 29/06* (2006.01)
*G06F 21/60* (2013.01)
*G06F 21/62* (2013.01)
*G06K 9/00* (2006.01)
*G06F 16/583* (2019.01)
*G10L 17/00* (2013.01)

(52) U.S. Cl.
CPC ..... *G06F 21/6218* (2013.01); *G06K 9/00718* (2013.01); *H04L 63/08* (2013.01); *H04L 63/102* (2013.01); *H04L 63/105* (2013.01); *H04L 67/306* (2013.01); *H04L 67/327* (2013.01); *G06F 2221/2113* (2013.01); *G10L 17/00* (2013.01); *Y10S 707/99943* (2013.01); *Y10S 707/99948* (2013.01)

(56) References Cited

U.S. PATENT DOCUMENTS

| | | | |
|---|---|---|---|
| 4,972,363 A | 11/1990 | Nguyen et al. |
| 5,214,746 A | 5/1993 | Fogel et al. |
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador, I et al. |
| 5,745,678 A | 4/1998 | Herzberg et al. |
| 5,754,938 A * | 5/1998 | Herz .................. G06Q 20/383 |
| | | | 348/E7.056 |
| 5,763,069 A | 6/1998 | Jordan |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 5,991,306 A | 11/1999 | Burns et al. |
| 6,038,560 A | 3/2000 | Wical |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,240,423 B1 | 5/2001 | Hirata |
| 6,243,375 B1 | 6/2001 | Speicher |
| 6,243,713 B1 | 6/2001 | Nelson et al. |
| 6,275,599 B1 | 8/2001 | Adler et al. |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,550,018 B1 | 4/2003 | Abonamah et al. |
| 6,557,042 B1 | 4/2003 | He et al. |
| 6,560,597 B1 | 5/2003 | Dhillon et al. |
| 6,594,699 B1 | 7/2003 | Sahai et al. |
| 6,601,026 B2 | 7/2003 | Appelt et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,675,159 B1 | 1/2004 | Lin et al. |
| 6,681,032 B2 | 1/2004 | Bortolussi et al. |
| 6,704,725 B1 | 3/2004 | Lee |
| 6,728,706 B2 | 4/2004 | Aggarwal et al. |
| 6,732,149 B1 | 5/2004 | Kephart |
| 6,742,094 B2 * | 5/2004 | Igari ...................... G06F 21/80 |
| | | | 711/163 |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 * | 11/2004 | Smith ................. G06K 9/00744 |
| | | | 382/181 |
| 6,836,776 B2 | 12/2004 | Schreiber |
| 6,845,374 B1 | 1/2005 | Oliver et al. |
| 6,901,207 B1 * | 5/2005 | Watkins ................... H04N 5/85 |
| | | | 348/E7.061 |
| 6,938,025 B1 | 8/2005 | Lulich et al. |
| 6,970,881 B1 | 11/2005 | Mohan et al. |
| 6,978,264 B2 | 12/2005 | Chandrasekar et al. |
| 6,985,172 B1 | 1/2006 | Rigney et al. |
| 7,006,689 B2 | 2/2006 | Kasutani |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |

(56) References Cited

U.S. PATENT DOCUMENTS

| | | |
|---|---|---|
| 7,124,149 B2 | 10/2006 | Smith et al. |
| 7,158,681 B2 | 1/2007 | Persiantsev |
| 7,199,798 B1 | 4/2007 | Echigo et al. |
| 7,215,828 B2 | 5/2007 | Luo |
| 7,260,564 B1 * | 8/2007 | Lynn ............... H04N 21/64784 |
| 7,277,928 B2 | 10/2007 | Lennon |
| 7,296,012 B2 | 11/2007 | Ohashi |
| 7,299,261 B1 | 11/2007 | Oliver et al. |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,392,238 B1 | 6/2008 | Zhou et al. |
| 7,406,459 B2 | 7/2008 | Chen et al. |
| 7,433,895 B2 | 10/2008 | Li et al. |
| 7,450,740 B2 | 11/2008 | Shah et al. |
| 7,464,086 B2 | 12/2008 | Black et al. |
| 7,523,102 B2 | 4/2009 | Bjarnestam et al. |
| 7,526,607 B1 | 4/2009 | Singh et al. |
| 7,529,659 B2 | 5/2009 | Wold |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,694,318 B2 | 4/2010 | Eldering et al. |
| 7,836,054 B2 | 11/2010 | Kawai et al. |
| 7,860,895 B1 | 12/2010 | Scofield |
| 7,920,894 B2 | 4/2011 | Wyler |
| 7,921,107 B2 | 4/2011 | Chang et al. |
| 7,921,288 B1 * | 4/2011 | Hildebrand ............ H04L 63/04 713/165 |
| 7,933,407 B2 | 4/2011 | Keidar et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,036,893 B2 | 10/2011 | Reich |
| 8,098,934 B2 | 1/2012 | Vincent |
| 8,112,376 B2 | 2/2012 | Raichelgauz et al. |
| 8,266,185 B2 | 9/2012 | Raichelgauz et al. |
| 8,312,031 B2 | 11/2012 | Raichelgauz et al. |
| 8,315,442 B2 | 11/2012 | Gokturk et al. |
| 8,326,775 B2 | 12/2012 | Raichelgauz et al. |
| 8,345,982 B2 | 1/2013 | Gokturk et al. |
| 8,386,400 B2 | 2/2013 | Raichelgauz et al. |
| 8,457,827 B1 | 6/2013 | Ferguson et al. |
| 8,495,489 B1 | 7/2013 | Everingham |
| 8,548,828 B1 | 10/2013 | Longmire |
| 8,655,801 B2 | 2/2014 | Raichelgauz et al. |
| 8,655,878 B1 | 2/2014 | Kulkarni et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,175 B2 | 8/2014 | Sereboff |
| 8,799,176 B2 | 8/2014 | Walker |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,286,623 B2 | 3/2016 | Raichelgauz et al. |
| 9,292,519 B2 | 3/2016 | Raichelgauz et al. |
| 9,323,754 B2 | 4/2016 | Ramanathan et al. |
| 9,330,189 B2 | 5/2016 | Raichelgauz et al. |
| 9,372,940 B2 | 6/2016 | Raichelgauz et al. |
| 9,384,196 B2 | 7/2016 | Raichelgauz et al. |
| 9,396,435 B2 | 7/2016 | Raichelgauz et al. |
| 9,438,270 B2 | 9/2016 | Raichelgauz et al. |
| 9,449,001 B2 | 9/2016 | Raichelgauz et al. |
| 9,477,658 B2 | 10/2016 | Raichelgauz et al. |
| 9,466,068 B2 | 11/2016 | Raichelgauz et al. |
| 9,489,431 B2 | 11/2016 | Raichelgauz et al. |
| 9,529,984 B2 | 12/2016 | Raichelgauz et al. |
| 9,558,449 B2 | 1/2017 | Raichelgauz et al. |
| 9,575,969 B2 | 2/2017 | Raichelgauz et al. |
| 9,639,532 B2 | 5/2017 | Raichelgauz et al. |
| 9,646,005 B2 | 5/2017 | Raichelgauz et al. |
| 9,646,006 B2 | 5/2017 | Raichelgauz et al. |
| 9,652,785 B2 | 5/2017 | Raichelgauz et al. |
| 9,672,217 B2 | 6/2017 | Raichelgauz et al. |
| 9,679,062 B2 | 6/2017 | Schillings et al. |
| 9,691,164 B2 | 6/2017 | Raichelgauz et al. |
| 9,747,420 B2 | 8/2017 | Raichelgauz et al. |
| 9,767,143 B2 | 9/2017 | Raichelgauz et al. |
| 9,792,620 B2 | 10/2017 | Raichelgauz et al. |
| 9,798,795 B2 | 10/2017 | Raichelgauz et al. |
| 9,807,442 B2 | 10/2017 | Bhatia et al. |
| 9,886,437 B2 | 2/2018 | Raichelgauz et al. |
| 9,984,369 B2 | 5/2018 | Li et al. |
| 2001/0019633 A1 | 9/2001 | Tenze |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0019882 A1 | 2/2002 | Bokhani |
| 2002/0032677 A1 | 3/2002 | Morgenthaler et al. |
| 2002/0037010 A1 | 3/2002 | Yamauchi |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0091947 A1 * | 7/2002 | Nakamura ............ G06F 21/31 726/17 |
| 2002/0099870 A1 | 7/2002 | Miller et al. |
| 2002/0107827 A1 | 8/2002 | Benitez-Jimenez et al. |
| 2002/0113812 A1 | 8/2002 | Walker et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |

(56) References Cited

U.S. PATENT DOCUMENTS

| | | |
|---|---|---|
| 2003/0093790 A1* | 5/2003 | Logan .................. G10H 1/0033 725/38 |
| 2003/0101150 A1 | 5/2003 | Agnihotri |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111432 A1 | 6/2004 | Adams et al. |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0163375 A1 | 7/2005 | Grady |
| 2005/0172130 A1 | 8/2005 | Roberts |
| 2005/0177372 A1 | 8/2005 | Wang et al. |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0069668 A1* | 3/2006 | Braddy .................. G06F 21/10 |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0247983 A1 | 11/2006 | Dalli |
| 2006/0248558 A1 | 11/2006 | Barton |
| 2006/0253423 A1 | 11/2006 | McLane et al. |
| 2006/0288002 A1 | 12/2006 | Epstein et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0174320 A1 | 7/2007 | Chou |
| 2007/0220573 A1 | 9/2007 | Chiussi et al. |
| 2007/0244902 A1 | 10/2007 | Seide et al. |
| 2007/0253594 A1* | 11/2007 | Lu ...................... G06K 9/00744 382/100 |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049789 A1 | 2/2008 | Vedantham et al. |
| 2008/0072256 A1* | 3/2008 | Boicey .................. G06F 16/78 725/46 |
| 2008/0091527 A1 | 4/2008 | Silverbrook et al. |
| 2008/0152231 A1 | 6/2008 | Gokturk et al. |
| 2008/0159622 A1 | 7/2008 | Agnihotri et al. |
| 2008/0163288 A1 | 7/2008 | Ghosal et al. |
| 2008/0165861 A1 | 7/2008 | Wen |
| 2008/0172615 A1 | 7/2008 | Igelman et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura |
| 2008/0263579 A1 | 10/2008 | Mears et al. |
| 2008/0270373 A1 | 10/2008 | Oostveen et al. |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0024641 A1 | 1/2009 | Quigley et al. |
| 2009/0037408 A1 | 2/2009 | Rodgers |
| 2009/0043637 A1 | 2/2009 | Eder |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0216761 A1 | 8/2009 | Raichelgauz et al. |
| 2009/0220138 A1 | 9/2009 | Zhang et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1 | 10/2009 | Redlich et al. |
| 2009/0277322 A1 | 11/2009 | Cai et al. |
| 2009/0282218 A1 | 11/2009 | Raichelgauz et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein |
| 2010/0125569 A1 | 5/2010 | Nair |
| 2010/0162405 A1 | 6/2010 | Cook |
| 2010/0173269 A1 | 7/2010 | Puri et al. |
| 2010/0198626 A1 | 8/2010 | Cho et al. |
| 2010/0268524 A1 | 10/2010 | Nath et al. |
| 2010/0284604 A1 | 11/2010 | Chrysanthakopoulos |
| 2010/0306193 A1 | 12/2010 | Pereira et al. |
| 2010/0318493 A1 | 12/2010 | Wessling |
| 2010/0322522 A1 | 12/2010 | Wang et al. |
| 2010/0325138 A1 | 12/2010 | Lee et al. |

(56) References Cited

U.S. PATENT DOCUMENTS

| | | |
|---|---|---|
| 2010/0325581 A1 | 12/2010 | Finkelstein et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0164180 A1 | 7/2011 | Lee |
| 2011/0164810 A1 | 7/2011 | Zang et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll |
| 2012/0179642 A1 | 7/2012 | Sweeney et al. |
| 2012/0185445 A1 | 7/2012 | Borden et al. |
| 2012/0197857 A1 | 8/2012 | Huang |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0226930 A1 | 8/2013 | Arngren et al. |
| 2013/0283401 A1 | 10/2013 | Pabla et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0125703 A1 | 5/2014 | Roveta |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341476 A1 | 11/2014 | Kulick et al. |
| 2015/0100562 A1 | 4/2015 | Kohlmeier et al. |
| 2015/0120627 A1 | 4/2015 | Hunzinger et al. |
| 2015/0254344 A1 | 9/2015 | Kulkarni et al. |
| 2015/0286742 A1 | 10/2015 | Zhang et al. |
| 2015/0289022 A1 | 10/2015 | Gross |
| 2015/0324356 A1 | 11/2015 | Gutierrez et al. |
| 2016/0007083 A1 | 1/2016 | Gurha |
| 2016/0026707 A1 | 1/2016 | Ong et al. |
| 2016/0306798 A1 | 10/2016 | Guo et al. |
| 2017/0017638 A1 | 1/2017 | Satyavarta et al. |
| 2017/0154241 A1 | 6/2017 | Shambik et al. |

FOREIGN PATENT DOCUMENTS

| | | |
|---|---|---|
| WO | 0231764 A2 | 4/2002 |
| WO | 2003005242 A1 | 1/2003 |
| WO | 2003067467 A1 | 8/2003 |
| WO | 2004019527 A1 | 3/2004 |
| WO | 2005027457 A1 | 3/2005 |
| WO | 2007049282 A2 | 5/2007 |
| WO | 20070049282 | 5/2007 |
| WO | PCT/US08/73852 | 8/2008 |
| WO | PCT/US13/46155 | 6/2013 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |
| WO | PCT/US16/50471 | 9/2016 |
| WO | PCT/US16/54634 | 9/2016 |
| WO | PCT/US16/59111 | 10/2016 |
| WO | PCT/US17/15831 | 1/2017 |

OTHER PUBLICATIONS

Semizarov et al. "Specificity of Short Interfering RNA Determined through Gene Expression Signatures", PNAS, 2003, pp. 6347-6352.

Shih-Fu Chang, et al., "VideoQ: A Fully Automated Video Retrieval System Using Motion Sketches", 1998, IEEE, , New York, pp. 1-2.

The International Search Report and the Written Opinion for PCT/US2016/054634 dated Mar. 16, 2017, ISA/RU, Moscow, RU.

Theodoropoulos et al, "Simulating Asynchronous Architectures on Transputer Networks", Proceedings of the Fourth Euromicro Workshop on Parallel and Distributed Processing, 1996. PDP '96.

Vailaya, et al., "Content-Based Hierarchical Classification of Vacation Images," I.E.E.E.: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.

Wang et al. "A Signature for Content-based Image Retrieval Using a Geometrical Transform", ACM 1998, pp. 229-234.

Wei-Te Li et al., "Exploring Visual and Motion Saliency for Automatic Video Object Extraction", IEEE, vol. 22, No. 7, Jul. 2013, pp. 1-11.

Whitby-Strevens, "The Transputer", 1985 IEEE, Bristol, UK.

Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

Yanai, "Generic Image Classification Using Visual Knowledge on the Web," MM'03, Nov. 2-8, 2003, Tokyo, Japan, pp. 167-176.

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.

Zhou et al., "Ensembling neural networks: Many could be better than all"; National Laboratory for Novel Software Technology, Nanjing Unviersirty, Hankou Road 22, Nanjing 210093, PR China; Available online Mar. 12, 2002.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

(56) References Cited

OTHER PUBLICATIONS

Boari et al, "Adaptive Routing for Dynamic Applications in Massively Parallel Architectures", 1995 IEEE, Spring 1995.
Brecheisen, et al., "Hierarchical Genre Classification for Large Music Collections", ICME 2006, pp. 1385-1388.
Cernansky et al., "Feed-forward Echo State Networks"; Proceedings of International Joint Conference on Neural Networks, Montreal, Canada, Jul. 31-Aug. 4, 2005.
Chuan-Yu Cho, et al., "Efficient Motion-Vector-Based Video Search Using Query by Clip", 2004, IEEE, Taiwan, pp. 1-4.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Foote, Jonathan et al., "Content-Based Retrieval of Music and Audio"; 1997, Institute of Systems Science, National University of Singapore, Singapore (Abstract).
Gomes et al., "Audio Watermaking and Fingerprinting: For Which Applications?" University of Rene Descartes, Paris, France, 2003.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.
Guo et al, "AdOn: An Intelligent Overlay Video Advertising System", SIGIR, Boston, Massachusetts, Jul. 19-23, 2009.
Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
Ihab Al Kabary, et al., "SportSense: Using Motion Queries to Find Scenes in Sports Videos", Oct. 2013, ACM, Switzerland, pp. 1-3.
International Search Authority: "Written Opinion of the International Searching Authority" (PCT Rule 43bis.1) Including International Search Report for International Patent Application No. PCT/US2008/073852; dated Jan. 28, 2009.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.
International Search Report for the corresponding International Patent Application PCT/IL2006/001235; dated Nov. 2, 2008.
IPO Examination Report under Section 18(3) for corresponding UK application No. GB1001219.3, dated Sep. 12, 2011.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251 German National Research Center for Information Technology.
Jianping Fan et al., "Concept-Oriented Indexing of Video Databases: Towards Semantic Sensitive Retrieval and Browsing", IEEE, vol. 13, No. 7, Jul. 2004, pp. 1-19.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.20142359332 IEEE Journals & Magazines.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
May et al., "The Transputer", Springer-Verlag, Berlin Heidelberg, 1989, teaches multiprocessing system.
Mcnamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publication.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.
Nam, et al., "Audio Visual Content-Based Violent Scene Characterization", Department of Electrical and Computer Engineering, Minneapolis, MN, 1998, pp. 353-357.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Odinaev, et al., "Cliques in Neural Ensembles as Perception Carriers", Technion—Israel Institute of Technology, 2006 International Joint Conference on Neural Networks, Canada, 2006, pp. 285-292.

(56) References Cited

OTHER PUBLICATIONS

Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Santos, et al., "SCORM-MPEG: an Ontology of Interoperable Metadata for Multimedia and e-Learning", 2015 23rd International Conference on Software, Telecommunications and Computer Networks (SoftCOM) Year 2015, pp. 224-228, DOI: 10.1109/SOFTCOM.2015.7314122 IEEE Conference Publications.
Zhu et al., "Technology-Assisted Dietary Assesment", Proc SPIE. Mar. 20, 2008 pp. 1-15.
Zou et al., "A Content-Based Image Authentication System with Lossless Data Hiding", ICME 2003, pp. 213-216.
Ma Et El. ("Semantics modeling based image retrieval system using neural networks" 2005 (Year: 2005).
"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
Mcnamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al, "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.

(56) References Cited

OTHER PUBLICATIONS

Stolberg et al ("Hibrid-Soc: A Multi-Core Soc Architecture for Multimedia Signal Processing" 2003).
Stolberg et al, "Hibrid-Soc: A Mul Ti-Core Soc Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, Available online Mar. 12, 2002, pp. 239-263.
Zhou, et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
U.S. Appl. No. 13/770,603, filed Feb. 19, 2013, 2005, 029993 / 0889, Mar. 14, 2013.
U.S. Appl. No. 13/773,112, filed Feb. 21, 2013, 2849, 029993 / 0494, Mar. 14, 2013.
U.S. Appl. No. 13/856,201, filed Apr. 3, 2013, 6289, 030145 / 0498, Apr. 3, 2013.
U.S. Appl. No. 14/050,991, filed Oct. 10, 2013, 7327, 031383 / 0695, Oct. 10, 2013.
U.S. Appl. No. 14/087,800, filed Nov. 22, 2013, 5371, 031661 / 0235, Nov. 22, 2013.
U.S. Appl. No. 14/096,865, filed Dec. 4, 2013, 9884, 032184 / 0495, Feb. 10, 2014.
U.S. Appl. No. 14/168,811, filed Jan. 30, 2014, 9919, 032098 / 0160, Jan. 30, 2014.
U.S. Appl. No. 14/171,158, filed Feb. 3, 2014, 2230, 032120 / 0406, Feb. 3, 2014.
U.S. Appl. No. 14/175,569, filed Feb. 7, 2014, 5399.
U.S. Appl. No. 14/198,178, filed Mar. 5, 2014, 7508, 032404 / 0279, Mar. 11, 2014.
U.S. Appl. No. 14/203,047, filed Mar. 10, 2014, 7502, 032397 / 0187, Mar. 10, 2014.
U.S. Appl. No. 14/209,448, filed Mar. 13, 2014, 4145, 032476 / 0634, Mar. 19, 2014.
U.S. Appl. No. 14/212,213, filed Mar. 14, 2014, 4448, 032442 / 0856, Mar. 14, 2014.
U.S. Appl. No. 15/455,363, filed Mar. 10, 2017, 9822, 041938 / 0941, Apr. 10, 2017.
U.S. Appl. No. 14/224,923, filed Mar. 25, 2014, 1000, 032614 / 0511, Apr. 7, 2014.
U.S. Appl. No. 14/267,990, filed May 2, 2014, 1006, 033904 / 0715, Oct. 7, 2014.
U.S. Appl. No. 14/280,928, filed May 19, 2014, 8201, 033904 / 0730, Oct. 7, 2014.
U.S. Appl. No. 14/302,487, filed Jun. 12, 2014, 1231, 033087 / 0104, Jun. 12, 2014.
U.S. Appl. No. 15/336,218, filed Oct. 27, 2016, 9795, 040899 / 0502, Dec. 13, 2016.
U.S. Appl. No. 14/321,231, filed Jul. 1, 2014, 4913, 033904 / 0651, Oct. 7, 2014.
U.S. Appl. No. 14/449,795, filed Sep. 29, 2014, 4578, 034201 / 0433, Nov. 18, 2014.
U.S. Appl. No. 14/509,552, filed Oct. 8, 2014, 1880, 035197 / 0242, Mar. 19, 2015.
U.S. Appl. No. 14/513,863, filed Oct. 14, 2014, 1023.
U.S. Appl. No. 14/530,922, filed Nov. 3, 2014, 1558, 035911 / 0602, Jun. 26, 2015.
U.S. Appl. No. 14/596,605, filed Jan. 14, 2015, 2831, 035197 / 0232, Mar. 19, 2015.
U.S. Appl. No. 14/596,553, filed Jan. 14, 2015, 2879, 035197 / 0237, Mar. 19, 2015.
U.S. Appl. No. 14/597,324, filed Jan. 15, 2015, 5454, 035197 / 0227, Mar. 19, 2015.
U.S. Appl. No. 14/608,880, filed Jan. 29, 2015, 1008, 035197 / 0217, Mar. 19, 2015.
U.S. Appl. No. 14/621,643, filed Feb. 13, 2015, 1441, 035197 / 0212, Mar. 19, 2015.
U.S. Appl. No. 14/621,661, filed Feb. 13, 2015, 8499, 035197 / 0207, Mar. 19, 2015.
U.S. Appl. No. 14/638,210, filed Mar. 4, 2015, 4604, 035938 / 0430, Jun. 30, 2015.
U.S. Appl. No. 14/638,176, filed Mar. 4, 2015, 5867, 035938 / 0439, Jun. 30, 2015.
U.S. Appl. No. 14/700,809, filed Apr. 30, 2015, 1070, 035911 / 0609, Jun. 26, 2015.
U.S. Appl. No. 14/700,801, filed Apr. 30, 2015, 6090, 035911 / 0629, Jun. 26, 2015.
U.S. Appl. No. 14/811,185, filed Jul. 28, 2015, 169, 037761 / 0445, Feb. 18, 2016.
U.S. Appl. No. 14/811,201, filed Jul. 28, 2015, 9938, 037761 / 0494, Feb. 18, 2016.
U.S. Appl. No. 14/811,209, filed Jul. 28, 2015, 1344, 037761 / 0399, Feb. 18, 2016.
U.S. Appl. No. 14/811,219, filed Jul. 28, 2015, 4583, 037761 / 0290, Feb. 18, 2016.
U.S. Appl. No. 14/811,227, filed Jul. 28, 2015, 1039, 037761 / 0428, Feb. 18, 2016.
U.S. Appl. No. 14/836,249, filed Aug. 26, 2015, 4950, 037761 / 0520, Feb. 18, 2016.
U.S. Appl. No. 14/836,254, filed Aug. 26, 2015, 6238, 037761 / 0452, Feb. 18, 2016.
U.S. Appl. No. 19/962,532, filed Dec. 8, 2015, 1907.
U.S. Appl. No. 14/606,546, filed Jan. 27, 2015, 7867, 035197 / 0222, Mar. 19, 2015.
U.S. Appl. No. 14/994,435, filed Jan. 13, 2016, 3530.
U.S. Appl. No. 15/019,223, filed Feb. 9, 2016, 4736.
U.S. Appl. No. 15/140,977, filed Apr. 28, 2016, 8305.
U.S. Appl. No. 15/162,042, filed May 23, 2016, 3430.
U.S. Appl. No. 15/189,386, filed Jun. 22, 2016, 8685.
U.S. Appl. No. 15/206,711, filed Jul. 11, 2016, 2371.
U.S. Appl. No. 15/206,792, filed Jul. 11, 2016, 4235.
U.S. Appl. No. 15/206,726, filed Jul. 11, 2016, 9860.
U.S. Appl. No. 15/252,790, filed Aug. 31, 2016, 4898.
U.S. Appl. No. 15/258,072, filed Sep. 7, 2016, 2721.
U.S. Appl. No. 15/259,907, filed Sep. 8, 2016, 3361.
U.S. Appl. No. 15/265,117, filed Sep. 14, 2016, 1044.
U.S. Appl. No. 15/289,696, filed Oct. 10, 2016, 9829.
U.S. Appl. No. 15/296,551, filed Oct. 18, 2016, 4097.
U.S. Appl. No. 15/388,035, filed Dec. 22, 2016, 8616.
U.S. Appl. No. 15/416,415, filed Jan. 26, 2017, 9480.
U.S. Appl. No. 15/419,567, filed Jan. 30, 2017, 9596.
U.S. Appl. No. 15/420,989, filed Jan. 31, 2017, 4634.
U.S. Appl. No. 15/452,148, filed Mar. 7, 2017, 8584.
U.S. Appl. No. 15/456,902, filed Mar. 13, 2017, 1015.
U.S. Appl. No. 15/463,414, filed Mar. 20, 2017, 3589.

(56) References Cited

OTHER PUBLICATIONS

U.S. Appl. No. 15/474,019, filed Mar. 30, 2017, 1074.
U.S. Appl. No. 15/585,698, filed May 3, 2017, 1905.
U.S. Appl. No. 15/585,707, filed May 3, 2017, 9905.
U.S. Appl. No. 15/589,558, filed May 8, 2017, 4286.
U.S. Appl. No. 15/601,440, filed May 22, 2017, 8844.
U.S. Appl. No. 15/601,303, filed May 22, 2017, 3664.
U.S. Appl. No. 15/601,309, filed May 22, 2017, 9807.
U.S. Appl. No. 15/602,669, filed May 23, 2017, 6539.
U.S. Appl. No. 15/602,770, filed May 23, 2017, 5030.
U.S. Appl. No. 15/605,521, filed May 25, 2017, 9939.
U.S. Appl. No. 15/605,527, filed May 25, 2017, 2491.
U.S. Appl. No. 15/608,493, filed May 30, 2017, 9008.
U.S. Appl. No. 15/611,019, filed Jun. 1, 2017, 5245.
U.S. Appl. No. 15/612,643, filed Jun. 2, 2017, 9999.
U.S. Appl. No. 15/613,819, filed Jun. 5, 2017, 1054.
U.S. Appl. No. 15/614,982, filed Jun. 6, 2017, 8033.
U.S. Appl. No. 15/625,187, filed Jun. 16, 2017, 2303.
U.S. Appl. No. 15/628,171, filed Jun. 20, 2017, 1935.
U.S. Appl. No. 15/628,178, filed Jun. 20, 2017, 8005.
U.S. Appl. No. 15/637,674, filed Jun. 29, 2017, 7860.
U.S. Appl. No. 15/641,830, filed Jul. 5, 2017, 1041.
U.S. Appl. No. 15/647,888, filed Jul. 12, 2017, 8398.
U.S. Appl. No. 15/667,188, filed Aug. 2, 2017, 7479.
U.S. Appl. No. 15/677,496, filed Aug. 15, 2017, 9946.
U.S. Appl. No. 15/684,377, filed Aug. 23, 2017.
U.S. Appl. No. 15/695,665, filed Sep. 5, 2017.
U.S. Appl. No. 15/698,317, filed Sep. 7, 2017, 1088.
U.S. Appl. No. 15/700,893, filed Sep. 11, 2017.
U.S. Appl. No. 15/722,602, filed Oct. 2, 2017, 5987.
U.S. Appl. No. 15/722,608, filed Oct. 2, 2017, 4621.
U.S. Appl. No. 15/802,890, filed Nov. 3, 2017.
U.S. Appl. No. 15/808,292, filed Nov. 9, 2017.
U.S. Appl. No. 15/810,532, filed Nov. 13, 2017.
U.S. Appl. No. 15/813,453, filed Nov. 15, 2017.
U.S. Appl. No. 15/818,081, filed Nov. 20, 2017.
U.S. Appl. No. 15/820,731, filed Nov. 22, 2017.
U.S. Appl. No. 15/827,311, filed Nov. 30, 2017.
U.S. Appl. No. 15/834,937, filed Dec. 7, 2017.
U.S. Appl. No. 62/530,301.
U.S. Appl. No. 62/530,215.
U.S. Appl. No. 62/528,745.

\* cited by examiner

SYSTEM AND METHODS FOR DETERMINING ACCESS PERMISSIONS ON PERSONALIZED CLUSTERS OF MULTIMEDIA CONTENT ELEMENTS

CROSS-REFERENCE TO RELATED APPLICATIONS

The application claims the benefit of U.S. Provisional Application No. 62/340,709 filed May 24, 2016. This application is also a continuation-in-part (CIP) of U.S. patent application Ser. No. 15/452,148 filed on Mar. 7, 2017.

The Ser. No. 15/452,148 application claims the benefit of U.S. Provisional Application No. 62/307,517 filed on Mar. 13, 2016. The Ser. No. 15/452,148 application is also a continuation-in-part (CIP) of U.S. patent application Ser. No. 15/420,989 filed on Jan. 31, 2017. The Ser. No. 15/420,989 application is a CIP of U.S. patent application Ser. No. 14/509,558 filed on Oct. 8, 2014, now U.S. Pat. No. 9,575,969, which is a continuation of U.S. patent application Ser. No. 13/602,858 filed on Sep. 4, 2012, now U.S. Pat. No. 8,868,619. The Ser. No. 13/602,858 application is a continuation of U.S. patent application Ser. No. 12/603,123 filed on Oct. 21, 2009, now U.S. Pat. No. 8,266,185. The Ser. No. 12/603,123 application is a continuation-in-part of:

(1) U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006, which claims foreign priority from Israeli Application No. 171577 filed on Oct. 26, 2005, and Israeli Application No. 173409 filed on Jan. 29, 2006;

(2) U.S. patent application Ser. No. 12/195,863 filed on Aug. 21, 2008, now U.S. Pat. No. 8,326,775, which claims priority under 35 USC 119 from Israeli Application No. 185414 filed on Aug. 21, 2007, and which is also a continuation-in-part of the above-referenced U.S. patent application Ser. No. 12/084,150;

(3) U.S. patent application Ser. No. 12/348,888, filed Jan. 5, 2009, which is a CIP of the above-referenced U.S. patent application Ser. No. 12/084,150 and the above-referenced U.S. patent application Ser. No. 12/195,863; and (4) U.S. patent application Ser. No. 12/538,495, filed Aug. 10, 2009, now U.S. Pat. No. 8,312,031, which is a CIP of the above-referenced U.S. patent application Ser. No. 12/084,150; the above-referenced U.S. patent application Ser. No. 12/195,863; and the above-referenced U.S. patent application Ser. No. 12/348,888.

The contents of the above-referenced applications are hereby incorporated by reference.

TECHNICAL FIELD

The present disclosure relates generally to personalized clustering of multimedia content elements, and more specifically to enforcing access permissions on such clusters.

BACKGROUND

As the Internet continues to grow exponentially in size and content, the task of finding relevant and appropriate information has become increasingly complex. Further, the amount of data gathered, created, downloaded, and accessed by user devices (for example, photos saved in a smartphone) have similarly grown exponentially. Organized information can be browsed or searched more quickly than unorganized information. As a result, effective organization of content allowing for subsequent retrieval is becoming increasingly important.

Search engines are often used to search for information, either locally or over the World Wide Web. Many search engines receive queries from users and use such queries to find and return relevant content. The search queries may be in the form of, for example, textual queries, images, audio queries, etc.

Search engines often face challenges when searching for multimedia content (e.g., images, audio, videos, etc.). In particular, existing solutions for searching for multimedia content are typically based on metadata of multimedia content elements. Such metadata may be associated with a multimedia content element and may include parameters such as, for example, size, type, name, short description, tags describing articles or subject matter of the multimedia content element, and the like. A tag is a non-hierarchical keyword or term assigned to data (e.g., multimedia content elements). The name, tags, and short description are typically manually provided by, e.g., the creator of the multimedia content element (for example, a user who captured the image using his smart phone), a person storing the multimedia content element in a storage, and the like.

Tagging has gained widespread popularity in part due to the growth of social networking, photograph sharing, and bookmarking of websites. Some websites allow users to create and manage tags that categorize content using simple keywords. The users of such sites manually add and define descriptions used for tags. Some of these websites only allow tagging of specific portions of multimedia content elements (e.g., portions of images showing people). Thus, the tags assigned to a multimedia content may not fully capture the contents shown therein.

Further, because at least some of the metadata of a multimedia content element is typically provided manually by a user, such metadata may not accurately describe the multimedia content element or facets thereof. As examples, the metadata may be misspelled, provided with respect to a different image than intended, vague or otherwise fail to identify one or more aspects of the multimedia content, and the like. As an example, a user may provide a file name "weekend fun" for an image of a cat, which does not accurately indicate the contents (e.g., the cat) shown in the image. Thus, a query for the term "cat" would not return the "weekend fun" image.

Additionally, different users may utilize different tags to refer to the same subject or topic, thereby resulting in some multimedia content elements related to a particular subject having one tag and other multimedia content elements related to the subject having a different tag. For example, one user may tag images of trees with the term "plants," while another user tags images of trees with the term "trees." Thus, a query based on either the tag "plants" or the tag "trees" will only return results including one of the images despite both images being relevant to the query.

Tags may also be used to cluster multimedia content elements. For example, albums can be created based on tags assigned to pictures. However, due to the nature of such tags as discussed above, the identification of such albums may not be accurate.

Due to a need for delivering relevant content to users, solutions for identifying users' preferences have also been developed. Some existing solutions actively require an input from the users to specify their interests. However, profiles generated for users based on their inputs may be inaccurate as the users tend to provide information related to only their current interests, or only partial information due to privacy concerns. For example, users creating an account on Facebook® often provide only the mandatory information required for the creation of an account. Other existing solutions for identifying users' preferences track user activities online. However, such solutions may also result in inaccurate information, particularly when users search for information that may not actually be of particular interest.

User preferences are often utilized to provide relevant multimedia content to users. For example, known user preferences may be utilized by Facebook® to curate content to show up in a user's "feed." However, as noted above, user preferences may be unknown, incomplete, or otherwise inaccurate. Further, relevant multimedia content may be challenging to accurately identify. Specifically, some existing solutions for identifying relevant multimedia content element rely on analyzing or otherwise matching to metadata associated with the multimedia content to determine whether the content is relevant. However, as noted above, such metadata may be inaccurate or incomplete, thereby leading to failure to identify appropriate content.

Another deficiency related to the usage of metadata and/or tags relates to privacy issues. Specifically, access permissions (e.g., view or share) to a particular multimedia content element are typically based on a tag assigned to such an element. For example, a user of Facebook® can block sharing of pictures that are being tagged. However, the user cannot block the sharing or viewing of pictures that he or she appears in if the user was not tagged. Further, pictures stored locally in a smartphone can typically be viewed by anyone having access to device. Thus, such deficiencies jeopardize the privacy of user.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for determining access permissions to personalized clusters of multimedia content elements. The method comprises receiving a permission index designating at least the content description of at least one personalized cluster and an authentication factor; analyzing the content description; checking if there is at least one personalized cluster that matches the analyzed content description; and generating privacy metadata for each matching personalized cluster, wherein the privacy metadata includes at least the authentication factor associated with the respective content description matching the personalized cluster, wherein the generate privacy metadata determines access permission to the matching personalized cluster.

Some embodiments disclosed herein also include a system for determining access permissions to personalized clusters of multimedia content elements. The system comprises a processing circuitry; and a memory, the memory containing instructions that, when executed by the processing circuitry, configure the system to: receive a permission index designating at least the content description of at least one personalized cluster and an authentication factor; analyze the content description; check if there is at least one personalized cluster that matches the analyzed content description; and generate privacy metadata for each matching personalized cluster, wherein the privacy metadata includes at least the authentication factor associated with the respective content description matching the personalized cluster, wherein the generate privacy metadata determines access permission to the matching personalized cluster.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
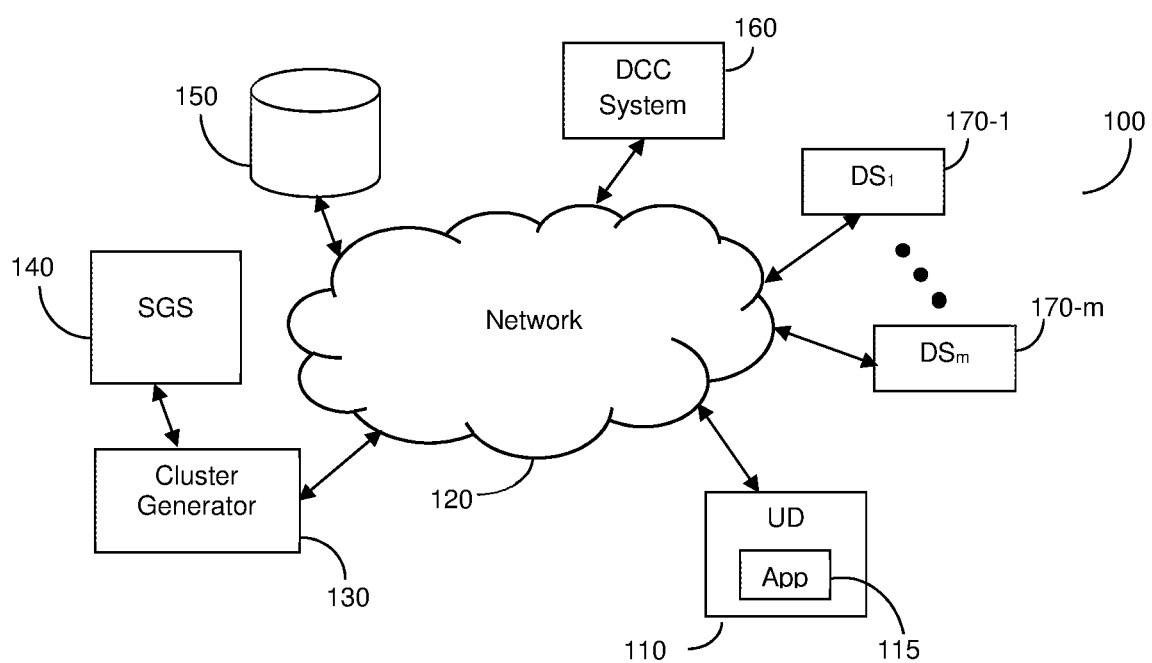
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to the disclosed embodiments, a system and method for determining and enforcing access permissions to personalized clusters of multimedia content elements (MMCEs) are disclosed. In an embodiment, for each cluster generated, privacy metadata is generated and associated with the cluster. The privacy metadata determines, in part, an authentication factor required to access the cluster. In an embodiment, a permission index is utilized to determine the privacy metadata, and hence the access permission to a personalized cluster.

The personalized clusters of MMCEs, generated according to some embodiments, allows for the organizing and searching of multimedia content elements based on common concepts that may be of interest to a user. In an example embodiment, a user profile may be created. User interests indicated in a user profile are identified. Based on the user interests, multimedia content elements to be clustered may be obtained. For each multimedia content element, at least one signature is generated. Based on the generated at least one signature, at least one search tag is generated for each multimedia content elements. Each of the multimedia content elements is added to a multimedia content element cluster based on the generated tags and the user interests, thereby creating personalized multimedia content element clusters. Each personalized cluster includes a plurality of multimedia content elements having at least one concept related to a user interest in common.

The common concept among multimedia content elements of a multimedia content element cluster may be a collection of signatures representing elements of the unstructured data and metadata describing the concept. The common concept may represent an item or aspect of the multimedia content elements such as, but not limited to, an object, a person, an animal, a pattern, a color, a background, a character, a sub textual aspect (e.g., an aspect indicating sub textual information such as activities or actions being performed, relationships among individuals shown such as teams or members of an organization, etc.), a meta aspect indicating information about the multimedia content element itself (e.g., an aspect indicating that an image is a "selfie" taken by a person in the image), words, sounds, voices, motions, combinations thereof, and the like. MMCEs may share a common concept when each of the multimedia content elements is associated with at least one signature, at least one portion of a signature, at least one tag, or a combination thereof, that is common to all of the multimedia content elements sharing a common concept.

The at least one multimedia content element may be clustered based further on metadata associated with a user. The user may be, but is not limited to, a user of a user device in which the at least one multimedia content element is stored. The clustering may include searching, based on the generated at least one signature, for clusters including multimedia content elements sharing a common concept. The searching may further include comparing the generated at least one signature to signatures of a plurality of multimedia content element clusters to determine matching signatures, where the at least one multimedia content element may be added to a cluster associated with matching signatures.

FIG. 1 shows an example network diagram 100 utilized to describe the various embodiments disclosed herein. The example network diagram 100 includes a user device 110, a cluster generator 130, a signature generator system 140, a database 150, a deep content classification (DCC) system 160, and a plurality of data sources 170-1 through 170-*m* (hereinafter referred to individually as a data source 170 and collectively as data sources 170, merely for simplicity purposes), communicatively connected via a network 120. The network 120 may be the Internet, the world-wide-web (WWW), a local area network (LAN), a wide area network (WAN), a metro area network (MAN), and other networks capable of enabling communication between the components of the network diagram 100.

The user device 110 may be, but is not limited to, a personal computer (PC), a personal digital assistant (PDA), a mobile phone, a smart phone, a tablet computer, a wearable computing device, a smart television, and other devices configured for storing, viewing, and sending multimedia content elements. The user device 110 may have installed thereon an application (app) 115. The application 115 may be downloaded from applications repositories such as, but not limited to, the AppStore®, Google Play®, or any other repositories storing applications. The application 115 may be pre-installed in the user device 110. The application 115 may be, but is not limited to, a mobile application, a virtual application, a web application, a native application, and the like. In an example implementation, the application 115 may be a web browser.

The cluster generator 130 is configured to generate personalized clusters of multimedia content elements. According to the disclosed embodiments, the cluster generator 130 is further configured to generate privacy metadata for each personalized cluster based on a permission level index and the content of the cluster. The privacy metadata determines whether the cluster can be accessed, and if so, the authentication factor that would permit an access to the cluster. Each personalized cluster includes a plurality of MMCEs associated with the generated at least one tag. A tag is a textual index term describing the contents of the cluster.

In an example embodiment, the authentication factor may include a single authentication factor using, e.g., a password, a biometric query, a voice recognition, a visual recognition a user's gesture. The authentication factor can require a two-factor of authentication. Enabling access to the cluster may allow preforming the operations related to view, share, and/or copy one or more of the MMCEs in the cluster. The privacy metadata is associated with the generated cluster.

In an embodiment, the cluster generator 130 is configured to obtain a permission index from the user device 110 (e.g., through the app 115). As noted above, the permission index defines a general description of the content to be restricted and an authentication factor required to access the cluster. The permission index may be defined by a user of, e.g., the user device 110 or generated automatically based on the user profile.

The cluster generator 130 is further configured to analyze any content description provided in the permission index and to identity any personalized cluster that matches the description. In an embodiment, the matching is textual matching of the description against the tag(s) associated with the personalized cluster. In another embodiment, a signature is generated for content description provided in the permission index. The generated signature is compared against the signature representing a personalized cluster.

The cluster generator 130 is further configured to generate a privacy metadata for each "matching" personalized cluster. The privacy metadata defines the respective authentication factor designated in the permission index. As an example, the content description in the permission index may be "kissing couples" and the authentication factor would be "password". Any personalized cluster having a tag that can indicate "kissing couples", such as "kiss", "kisses", "me and wife kissing" would be determined as matching the content description in the index. Thus, a privacy metadata for any such cluster would require a password to access the MMCEs in that cluster.

It should be noted that the privacy metadata being associated with each personalized cluster allows to enforce access permissions to the MMCEs in the cluster. For example, if a password is required to access a personalized cluster, only authorized users with the password can access the personalized cluster. The personalized clusters together with their respective privacy metadata can be saved in the user device 110, the database 150, and/or a web resource 170. Thus, according to the disclosed embodiments, the access permissions can be enforced when a cluster is locally accessed (e.g., on the user device 110) or remotely accessed (e.g., on the database 150).

It should be noted that the database 150 may be, for example, a data warehouse of a social media network, a cloud storage service, and the like. Thus, the access permissions can be enforced globally for anyone attempting to access a personalized cluster stored in the database 150.

The cluster generator 130 typically includes, but is not limited to, a processing circuitry connected to a memory, the memory containing instructions that, when executed by the processing circuitry, configure the cluster generator 130 to at least perform generation of personalized clusters of multimedia content elements as described herein. In an embodiment, the processing circuitry may be realized as an array of at least partially statistically independent computational cores, the properties of each core being set independently of the properties of each other core. An example block diagram of the cluster generator 130 is described further herein below with respect to FIG. 2.

In an embodiment, the cluster generator 130 may be configured to generate a user profile for a user. In a further embodiment, the user profile may be generated based on tracking of impressions of the user while viewing multimedia content. As an example, a tracking agent or other means for collection information installed on the user device 110 may be configured to provide the cluster generator 130 with tracking information related to each of the multimedia elements viewed or uploaded by the user and the interaction of the user with the multimedia elements. The information may include, but is not limited to, the multimedia element (or a URL referencing the element), the amount of time the user viewed the multimedia element, the user's gesture with respect to the multimedia element, a URL of a webpage that the element was viewed or uploaded to, and so on.

In an embodiment, the cluster generator 130 is configured to determine the user impression with respect to the received tracking information. The user impression may be determined per each multimedia element or for a group of elements. As noted above, the user impression indicates the user attention with respect to a multimedia content element. In one embodiment, the cluster generator 130 may first filter the tracking information to remove details that cannot help in the determination of the user impression. A user impression may be determined by, e.g., a user's click on an element, a scroll, hovering over an element with a mouse, change in volume, one or more key strokes, and so on. These impressions may further be determined to be either positive (i.e., demonstrating that a user is interested in the impressed element) or negative (i.e., demonstrating that a user is not particularly interested in the impressed element). Each impression may be represented by a value indicating the degree of impression as well as whether the impression is positive or negative. According to one embodiment, a filtering operation may be performed in order to analyze only meaningful impressions. Impressions may be determined as meaning measures and thereby ignored, e.g., if they fall under a predefined threshold.

In an embodiment, the cluster generator 130 may be configured to send the multimedia element or elements that are determined as having a positive user impression to the SGS 140. The SGS 140 is then configured to generate at least one signature for each multimedia element or each portion thereof. The generated signature(s) may be robust to noise and distortions as discussed below.

It should be appreciated that signatures may be used for profiling the user's interests, because signatures allow more accurate reorganization of multimedia elements in comparison than, for example, utilization of metadata. The signatures generated by the SGS 140 for the multimedia elements allow for recognition and classification of multimedia elements such as content-tracking, video filtering, multimedia taxonomy generation, video fingerprinting, speech-to-text, audio classification, element recognition, video/image search and any other application requiring content-based signatures generation and matching for large content volumes such as, web and other large-scale databases. For example, a signature generated by the SGS 140 for a picture showing a car enables accurate recognition of the model of the car from any angle at which the picture was taken.

In one embodiment, the generated signatures are matched against a database of concepts (not shown) to identify a concept that can be associated with the signature, and hence the multimedia element. For example, an image of a tulip would be associated with a concept of flowers.

The cluster generator 130 is configured to create the user profile using the identified concepts. That is, for each user, when a number of similar or identical concepts for multiple multimedia elements have been identified over time, the user's preference or interest can be established. The interest may be saved to a user profile created for the user. Whether two concepts are sufficiently similar or identical may be determined, e.g., by performing concept matching between the concepts. A concept (or a matching concept) is a collection of signatures representing a plurality of multimedia content elements and metadata describing the concept. The collection of signatures is a signature reduced cluster generated by inter-matching signatures generated for the plurality of multimedia elements.

For example, a concept of flowers may be determined as associated with a user interest in 'flowers' or 'gardening.' In one embodiment, the user interest may simply be the identified concept. In another embodiment, the interest may be determined using an association table which associates one or more identified concepts with a user interest. For example, the concept of 'flowers' and 'spring' may be associated with the interest of 'gardening'. Such an association table may be maintained in the cluster generator 130 or in the database 150.

In an embodiment, the cluster generator 130 may be configured to receive, from the user device 110, a request to generate personalized multimedia content element clusters. Clustering each of the multimedia content elements may include generating a cluster based on two or more multimedia content elements, or adding a multimedia content element to an existing cluster. The request may include, but is not limited to, the multimedia content element or plurality of multimedia content elements, an identifier of a user or user profile. As a non-limiting example, the request may include a user name. Alternatively or collectively, the cluster generator 130 may be configured to generate personalized multimedia content elements at periodic time intervals, upon detection of a cluster generation trigger event, and the like.

In an embodiment, the cluster generator 130 is configured to identify concepts representing user interests in a user profile of a user and to obtain, based on the identified user interests, multimedia content elements to be clustered into personalized clusters. Each obtained multimedia content element is related to an interest of the user and may include, but is not limited to, images, graphics, video streams, video clips, audio streams, audio clips, video frames, photographs, images of signals (e.g., spectrograms, phasograms, scalograms, etc.), combinations thereof, portions thereof, and the like.

In an embodiment, the multimedia content elements may be obtained from the data sources 170. Each of the data sources 170 may be, but is not limited to, a web server, an application server, a data repository, a database, and the like. Each of the data sources 170 may store data related to, e.g., social networks (e.g., Google+®, Facebook®, Twitter®, Instagram®, etc.), web blogs, news feeds, photo albums, and the like. More specifically, the data sources 170 may store tracking information at least for multimedia content elements related to the user (e.g., multimedia content elements uploaded by the user, multimedia content elements in which the user is tagged, multimedia content elements otherwise associated by the user, and the like).

The tracking information for each multimedia content element may include, but is not limited to, the multimedia content element, an identifier of the data source the multimedia content is stored in (e.g., an identifier indicating that the multimedia content element is from Facebook®), text entered in relation to uploading of the multimedia content element (e.g., a caption or tag provided by a user when uploading an image), a unique identifier of the user (e.g., a user name), user activity with respect to the multimedia content element (e.g., gestures such as clicks, scrolls, hovers, etc.), or a combination thereof. As a non-limiting example, the data source 170-1 may be a server of a social media website such that the obtained multimedia content elements used to generate the personalized clusters may be, e.g., images and videos posted on the social media website.

The obtained multimedia content elements are relevant to the identified interests. To this end, in an embodiment, obtaining the multimedia content elements may include searching for multimedia content elements associated with concepts matching the identified interests above a threshold. A multimedia content element may be associated with a matching concept if metadata of the multimedia content element matches metadata representing the user interest, if a signature of the multimedia content element matches a signature representing the user interest, or a combination thereof.

In an optional embodiment, the cluster generator 130 may be configured to send, to the signature generator system 140, each obtained multimedia content element. The signature generator system 140 is configured to generate signatures based on the sent multimedia content elements and to send the generated signatures to the cluster generator 130. In another embodiment, the cluster generator 130 may be configured to generate the signatures. Generation of signatures based on multimedia content elements is described further herein below with respect to FIGS. 3 and 4. In another embodiment, the signatures generated for more than one multimedia content element may be clustered.

The DCC system 160 is configured to continuously create a knowledge database for multimedia data. To this end, the DCC system 160 may be configured to initially receive a large number of multimedia content elements to create a knowledge database that is condensed into concept structures (hereinafter referred to as "concepts") that are efficient to store, retrieve, and check for matches. As new multimedia content elements are collected by the DCC system 160, they are efficiently added to the knowledge base and concepts such that the resource requirement is generally sub-linear rather than linear or exponential. The DCC system 160 is configured to extract patterns from each multimedia content element and selects the important/salient patterns for the creation of signatures thereof. A process of inter-matching between the patterns followed by clustering, is followed by reduction of the number of signatures in a cluster to a minimum that maintains matching and enables generalization to new multimedia content elements. Metadata respective of the multimedia content elements is collected, thereby forming, together with the reduced clusters, a concept.

In a further embodiment, the cluster generator 130 may be configured to obtain, from the DCC system 160, at least one concept matching each of the obtained multimedia content elements. In yet a further embodiment, the cluster generator 130 may be configured to query the DCC system 160 for the at least one matching concept. The query may be made with respect to the signatures for the multimedia content elements to be clustered. In an embodiment, multimedia content elements associated with the obtained matching concepts may be utilized for determining clusters to which the multimedia content elements to be clustered are added.

In an embodiment, the cluster generator 130 is configured to generate, based on the signatures for the multimedia content elements to be clustered, at least one tag for each multimedia content element. Each tag is a textual index term assigned to content. The generated tags are searchable (e.g., by the user device 110 or other user devices), and may be included in metadata for the multimedia content element. In an embodiment, the tags may be generated based on metadata of the obtained at least one concept. As a non-limiting example, if metadata of an obtained concept includes the word "Superman®", the generated tags may include the textual term "Superman®".

In an embodiment, based on the identified interests and based on the generated signatures, the generated tags, or both, the cluster generator 130 is configured to determine at least one multimedia content element cluster for each obtained multimedia content element. Each determined multimedia content element cluster includes a plurality of multimedia content elements sharing at least one common concept with each other and with the obtained multimedia content elements to be clustered.

The common concept of a plurality of multimedia content elements may be a collection of signatures representing elements of the unstructured data and metadata describing the concept. The common concept may represent an item or aspect of the multimedia content element such as, but not limited to, an object, a person, an animal, a pattern, a color, a background, a character, a sub textual aspect, a meta aspect, words, sounds, voices, motions, combinations thereof, and the like. In a further embodiment, multimedia content elements may share a common concept when each of the multimedia content elements is associated with at least one signature, at least one portion of a signature, at least one tag, or a combination thereof, that is common to the multimedia content elements sharing a common concept.

In an embodiment, each determined multimedia content element cluster includes a common concept related to one or more of the user's interests. In an embodiment, a common concept may be related to the user interest when the signatures of the common concept match signatures representing the user interest above a predetermined threshold.

It should be noted that multiple multimedia content element clusters may be determined for each multimedia content element, with each determined multimedia content element cluster being related to an interest of the user. As a non-limiting example, for an image showing a "selfie" of a person (i.e., an image showing the person that is captured by the person) taken on the beach, multimedia content element clusters including multimedia content elements showing selfies of the person or of other people and showing beach scenery may be determined when a user interest indicates that the user is interested in selfies and beach trips, and the selfie image may be clustered into each of the determined multimedia content element clusters.

In a further embodiment, determining the multimedia content element clusters may include comparing the generated signatures or the generated tags to signatures or tags, respectively, of a plurality of multimedia content element clusters. Each determined multimedia content element cluster may be, e.g., a cluster having signatures or tags that match the generated signatures or tags above a predetermined threshold. As a non-limiting example, a signature is generated based on a video showing a stand-up comedy performance by the comedian Jerry Seinfeld, and tags including "Jerry Seinfeld" and "stand-up comedy" are generated based on the generated signature. In yet a further embodiment, the determined multimedia content element clusters may include one cluster for each tag.

In yet a further embodiment, one or more of the multimedia content element clusters may be included in or associated with a concept such that the comparison may include comparing the generated signatures or the generated tags to a reduced set of signatures or metadata of the concept, respectively. In a further embodiment, the multimedia content elements to be clustered may be added to the concept having matching multimedia content element clusters.

In another embodiment, if no existing multimedia content element clusters having concepts in common with the multimedia content element can be found (e.g., if no signatures or tags match the generated signatures or tags above a predetermined threshold), the cluster generator 130 may be configured to generate a multimedia content element cluster including the multimedia content elements to be clustered. Generating the multimedia content element cluster may include, but is not limited to, searching in one or more data sources (e.g., the user device 110, the database 150, or other data sources not shown that may be accessible over, e.g., the Internet) to identify multimedia content elements sharing common concepts with the multimedia content element. The searching may be based on the generated signatures, the generated tags, or both. The identified multimedia content elements are clustered with the multimedia content element to be clustered, and the resulting cluster may be stored in, e.g., the database 150. In a further embodiment, the generated cluster may further include the generated tags.

It should be noted that using signatures for tagging multimedia content elements, clustering multimedia content elements, representing user interests, or a combination thereof, ensures more accurate generation of personalized multimedia content element clusters than, for example, when using manually provided metadata (e.g., tags provided by users). For instance, in order to cluster an image of a sports car into an appropriate cluster, it may be desirable to locate a car of a particular model. However, in most cases the model of the car would not be part of the metadata associated with the multimedia content (image). Moreover, the car shown in an image may be at angles different from the angles of a specific photograph of the car that is available as a search item. The signature generated for that image would enable accurate recognition of the model of the car because the signatures generated for the multimedia content elements, according to the disclosed embodiments, allow for recognition and classification of multimedia content elements, such as, content-tracking, video filtering, multimedia taxonomy generation, video fingerprinting, speech-to-text, audio classification, element recognition, video/image search and any other application requiring content-based signatures generation and matching for large content volumes such as, web and other large-scale databases.

The database 150 stores multimedia content elements, clusters of multimedia content elements, association tables of concepts and associated user interests, user profiles indicating user interests, personalized clusters, or a combination thereof. In an embodiment, the database 150 also stores privacy metadata associated with each personalized cluster.

In the example network diagram 100 shown in FIG. 1, the cluster generator 130 communicates with the database 150 through the network 120. In other non-limiting configurations, the cluster generator 130 may be directly connected to the database 150. The database 150 may be accessible to, e.g., the user device 110, other user devices (not shown), or both, thereby allowing for retrieval of clusters from the database 150 by such user devices.

It should also be noted that the signature generator system 140 and the DCC system 160 are shown in FIG. 1 as being separate from the cluster generator 130 merely for simplicity purposes and without limitation on the disclosed embodiments. The signature generator system 140, the DCC system 160, or both, may be included in the cluster generator 130 without departing from the scope of the disclosure.

It should be further noted that the personalized clusters and privacy metadata generation is described as being performed by the cluster generator 130 merely for simplicity purposes and without limitation on the disclosed embodiments. The personalized cluster and privacy metadata generation may be equally performed locally by, e.g., the user device 110, without departing from the scope of the disclosure. In such a case, the user device 110 may include the cluster generator 130, the signature generator system 140, the DCC system 160, or any combination thereof, or may otherwise be configured to perform any or all of the processes performed by such systems. Further, local clustering by the user device 110 may be based on multimedia content clusters stored locally on the user device 110.

It should be appreciated that the operation related to generating privacy metadata and/or personalized clusters may be executed locally on the user device 120 with no need for a network connection.

In some embodiments, the personalized clusters generation can be performed by the generator 130 while the creating of the privacy metadata is performed by the device 110 based on permission index stored therein. It should be noted the enforcement of the access permission based on the privacy metadata can be performed by the user device 110, the database 150, web resource 170, or any other element that can access or store the personalized metadata.

Figure 2:
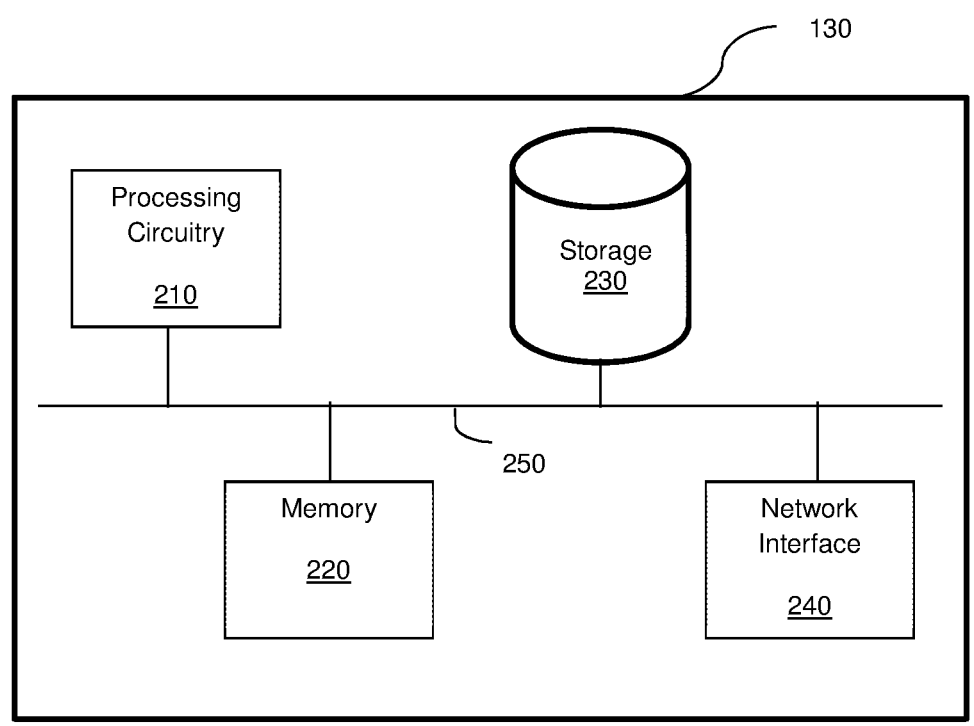
FIG. 2 is a block diagram illustrating a personalized cluster generator according to an embodiment.

FIG. 2 is an example block diagram illustrating the personalized cluster generator 130 implemented according to an embodiment. The cluster generator 130 includes a processing circuitry 210 coupled to a memory 220, a storage 230, and a network interface 240. In an embodiment, the components of the cluster generator 130 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information. In an embodiment, the processing circuitry 210 may be realized as an array of at least partially statistically independent computational cores. The properties of each computational core are set independently of those of each other core, as described further herein above.

The memory 220 may be volatile (e.g., RAM, etc.), non-volatile (e.g., ROM, flash memory, etc.), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise.

Instructions may include code (e.g., in source code format, binary code format, executable code format, or any other suitable format of code). The instructions, when executed by the processing circuitry 210, cause the processing circuitry 210 to perform the various processes described herein. Specifically, the instructions, when executed, cause the processing circuitry 210 to perform generation of personalized clusters and privacy metadata of multimedia content elements as described herein.

The storage 230 may be magnetic storage, optical storage, and the like, and may be realized, for example, as flash memory or other memory technology, CD-ROM, Digital Versatile Disks (DVDs), or any other medium which can be used to store the desired information.

The network interface 240 allows the cluster generator 130 to communicate with the signature generator system 140 for the purpose of, for example, sending multimedia content elements, receiving signatures, and the like. Additionally, the network interface 240 allows the cluster generator 130 to communicate with the data sources 170 in order to obtain multimedia content elements to be clustered.

It should be understood that the embodiments described herein are not limited to the specific architecture illustrated in FIG. 2, and other architectures may be equally used without departing from the scope of the disclosed embodiments. In particular, the cluster generator 130 may further include a signature generator system configured to generate signatures as described herein without departing from the scope of the disclosed embodiments.

Figure 3:
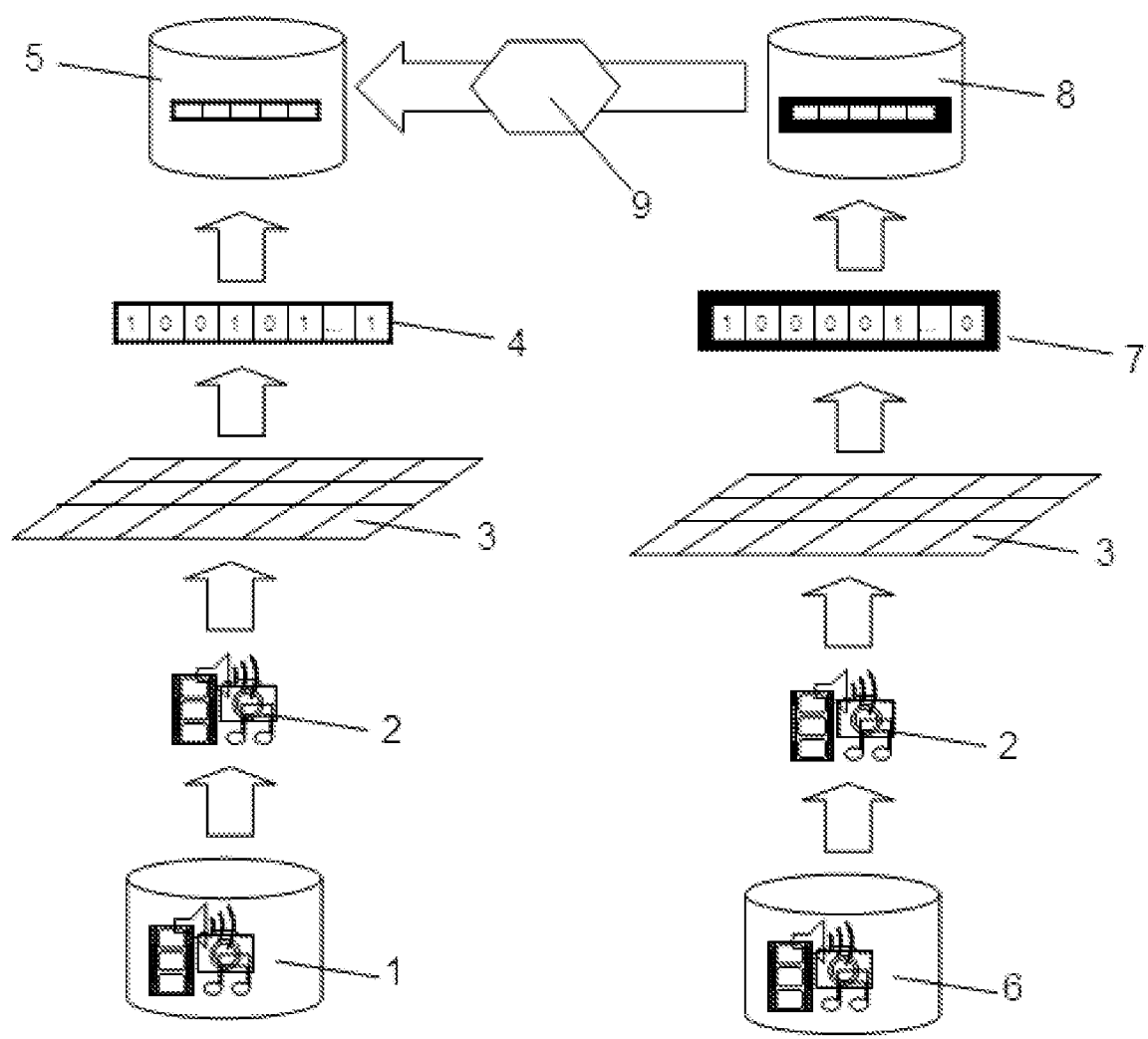
FIG. 3 is a block diagram depicting the basic flow of information in the signature generator system.
Figure 4:
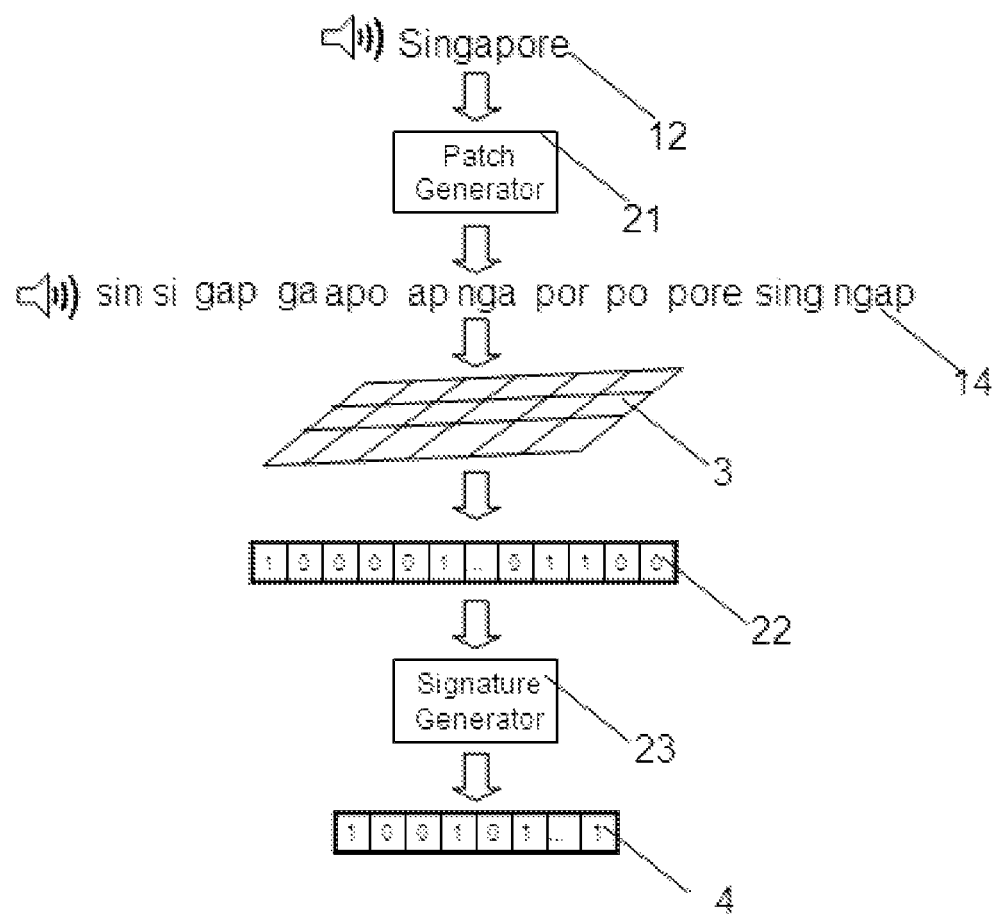
FIG. 4 is a diagram showing the flow of patches generation, response vector generation, and signature generation in a large-scale speech-to-text system.

FIGS. 3 and 4 illustrate the generation of signatures for the multimedia content elements by the signature generator system 140 according to an embodiment. An example high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture").

Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the context server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \theta(V_i - Th_x)$$

where, $\theta$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); $Th_x$ is a constant Threshold value, where 'x' is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:

1: For: $V_i > Th_{RS}$ $$1-p(V>Th_S)-1-(1-e)<<1$$

i.e., given that l nodes (cores) constitute a Robust Signature of a certain image I, the probability that not all of these l nodes will belong to the Signature of same, but noisy image, $\tilde{I}$ is sufficiently low (according to a system's specified accuracy).

2: $p(V>Th_{RS}) \approx 1/L$ i.e., approximately 1 out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to the common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the above-referenced U.S. Pat. No. 8,655,801.

Figure 5:
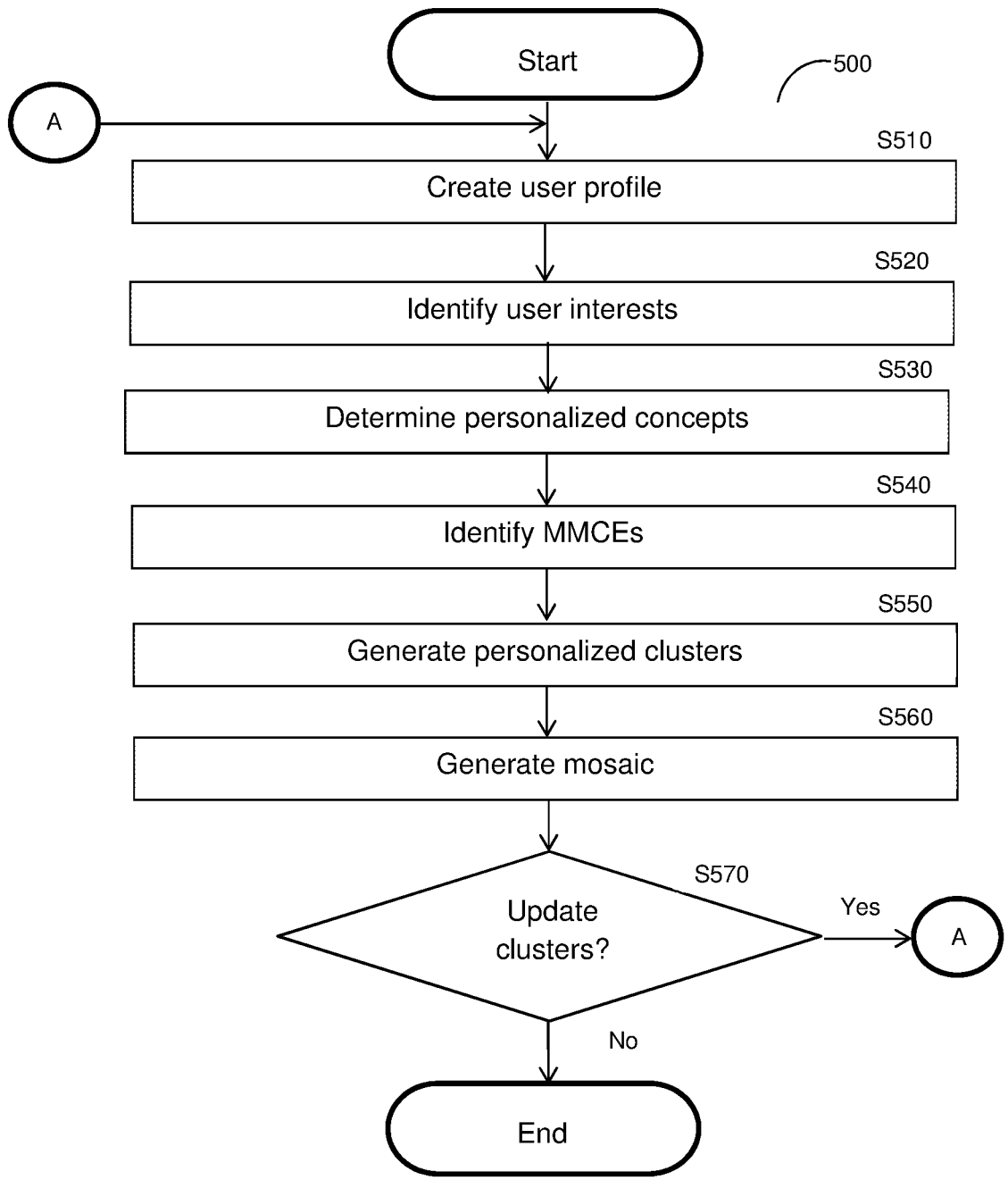
FIG. 5 is a flowchart illustrating a method for generating personalized clusters according to an embodiment.

FIG. 5 is an example flowchart 500 illustrating a method for generating personalized multimedia content element clusters for a user according to an embodiment. In an embodiment, the method may be performed by the personalized cluster generator 130, FIG. 1.

At optional S510, a user profile is created. The created user profile includes at least one user interest of a user as determined based on multimedia content elements associated with the user, multimedia contents viewed by the user, user interactions with multimedia content elements viewed by the user, or a combination thereof. In an embodiment, creating the user profile includes determining interests of the user based on tracking information for multimedia content elements related to the user. In a further embodiment, the user interests may be determined based on concepts of multimedia content elements of interest to the user. In an embodiment, S510 further includes storing the created user profile in a database (e.g., the database 150, FIG. 1). An example method for creating user profiles based on multimedia content is described further herein below with respect to FIG. 7.

Multimedia content elements related to the user may include, but are not limited to, multimedia contents provided by the user (e.g., uploaded to a social media account by the user), multimedia content elements associated with an identifier of the user (e.g., multimedia content elements having tags that indicate a user name of the user), or both. The tracking information for a multimedia content element may include, but is not limited to, the multimedia content element, an identifier of the data source the multimedia content is stored in (e.g., an identifier indicating that the multimedia content element is from Facebook®), text entered in relation to uploading of the multimedia content element (e.g., a caption or tag provided by a user when uploading an image), a unique identifier of the user (e.g., a user name), user activity with respect to the multimedia content element (e.g., gestures such as clicks, scrolls, hovers, etc.), or a combination thereof.

In a further embodiment, creating the user profile may further include determining, based on the tracking information, a user impression for each multimedia content element or group of multimedia content elements identified or included in the tracking information. The user impression for a multimedia content element or group of multimedia content elements at least indicates whether the user is interested in the multimedia content elements and, to this end, may be positive (i.e., indicating an interest in the subject matter of the multimedia content elements) or negative (i.e., indicating a lack of interest). The user impression may further indicate a degree of interest. In some embodiments, only multimedia content elements or groups of multimedia content elements that are meaningful (e.g., multimedia content elements associated with a degree of interest above a predetermined threshold) may be of interest to the user.

As a non-limiting example, if images of the user show the user riding a bicycle, the user profile may indicate user interest such as "bicycles," "extreme sports," "outdoor activity," and the like. As another non-limiting example, if videos showing the user holding a baby with the tag "my daughter," the user interests may indicate that the user has a baby daughter.

In an embodiment, if a user profile already exists for the user, S510 may include updating the user profile. In a further embodiment, the user profile may be updated when, e.g., new tracking information is obtained, at predetermined time intervals, both, and the like.

At S520, at least one user interest is identified. The identified at least one user interest may be indicated in a user profile associated with the user. The user profile may be, but is not limited to, the user profile created at S510, a previously created user profile, and the like. In an embodiment, S520 includes querying a user profile of the user for the at least one user interest.

At S530, at least one personalized concept is determined based on the identified at least one user interest. Each personalized concept represents an interest of the user and is utilized as a common concept for the personalized multimedia content element clusters.

Each personalized concept may be represented by a signature. To this end, in an embodiment, S530 may include generating a signature for each identified user interest, where a concept represented by the signature is utilized as the common concept for a personalized multimedia content element cluster. As a non-limiting example, if the user interest is "fishing," a signature representing the concept of "fishing" may be utilized to represent the personalized concept for the user.

At S540, a plurality of multimedia content elements related to the user is identified. The identified multimedia content elements may include, but are not limited to, multimedia content elements uploaded by the user, multimedia content elements associated with identifiers of the user (e.g., multimedia content elements having tags indicating an identifier of the user), both, and the like.

At S550, at least one personalized multimedia content element cluster is generated based on the identified multimedia content elements. Each cluster includes a plurality of the identified multimedia content elements having one of the determined at least one personalized concept as a common concept. The clusters allow for organization of multimedia content elements with respect to subject matter, thereby allowing for targeted searches of multimedia content elements, convenient viewing of related multimedia content elements, and the like. In an embodiment, if a personalized cluster already exists for a user interest of the user, S550 may include updating the personalized cluster by adding the obtained multimedia content elements. In a further embodiment, duplicate multimedia content elements may be excluded from the updated personalized clusters. Generating clusters of multimedia content elements is described further herein below with respect to FIG. 6.

At optional S560, a personalized mosaic may be generated. The personalized mosaic represents personalized clusters associated with the user and may include, but is not limited to, an icon representing each cluster, a textual description of the content of each cluster, or a combination thereof. The generated mosaic may be an interactive mosaic allowing for viewing of a respective personalized cluster when a user interacts with, e.g., an icon of the mosaic representing the personalized cluster.

At S570, it is determined if the clusters should be updated and, if so, execution continues with S510. In an embodiment, it may be determined that the clusters should be updated if additional tracking information has been received, if additional multimedia content elements related to the user are available (i.e., if additional multimedia content elements that may be added to the personalized clusters have been received), and the like.

Figure 6:
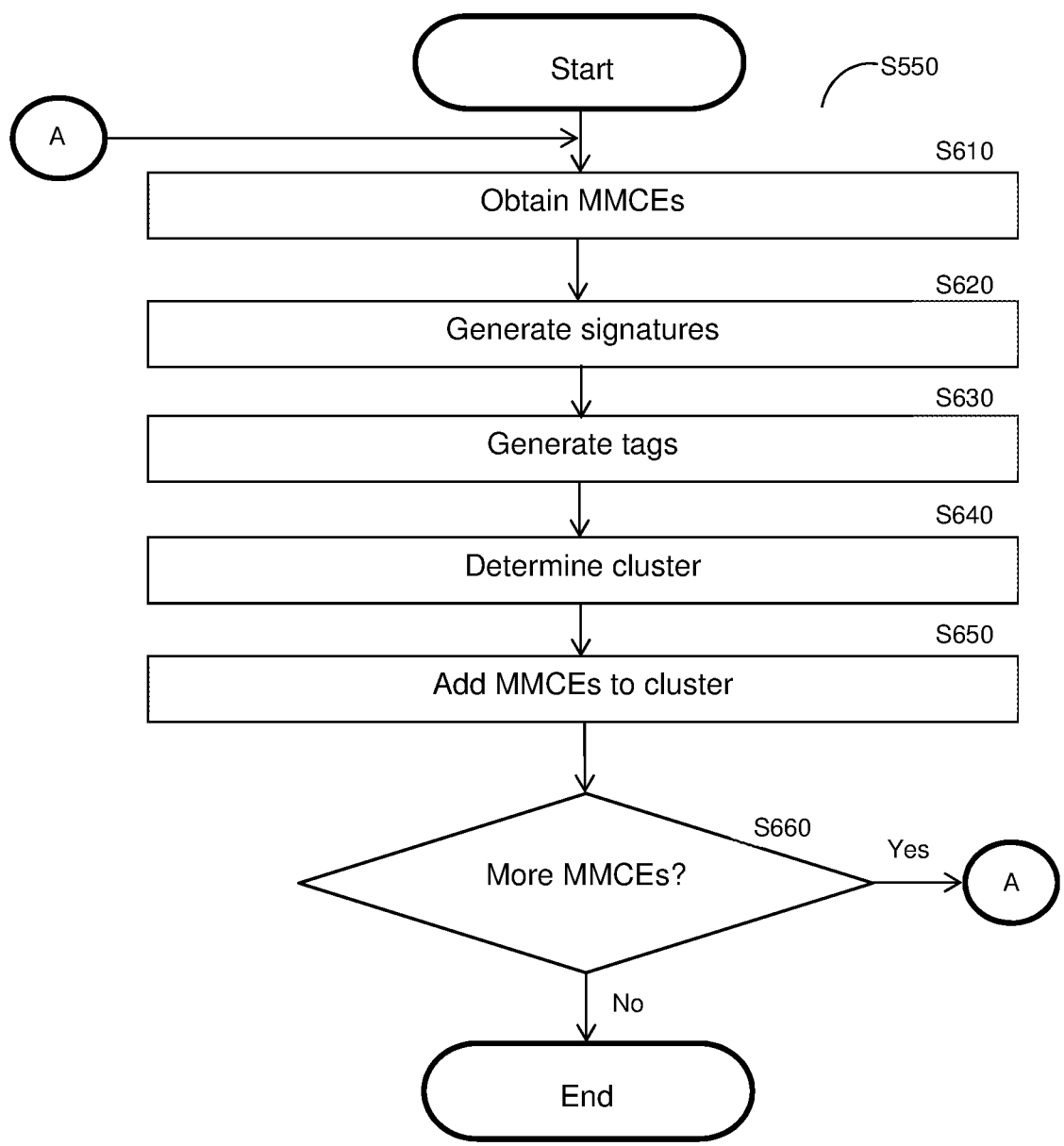
FIG. 6 is a flowchart illustrating a method for clustering multimedia content elements according to an embodiment.

FIG. 6 is an example flowchart S550 illustrating a method for clustering of multimedia content elements according to an embodiment.

At S610, at least one multimedia content element to be clustered is obtained. In an embodiment, the at least one multimedia content element may include multimedia content elements identified as related to the user (e.g., as described herein above with respect to S540, FIG. 5).

At S620, at least one signature is generated for each obtained multimedia content element. Each generated signature may be robust to noise and distortion. In an embodiment, the signatures are generated by a signature generator system as described further herein below with respect to FIGS. 3 and 4. In another embodiment, S620 may include sending, to a signature generator system (e.g., the signature generator system 140, FIG. 1), the multimedia content element and receiving, from the signature generator system, the at least one signature generated for each multimedia content element.

At optional S630, at least one tag is generated for the at least one multimedia content element based on the generated at least one signature. Each tag is a textual index term assigned to the multimedia content element as described further herein above. As non-limiting examples of tags, the tag "me" may be assigned to an image of the user's face, the tag "my dog" may be assigned to an image of a dog, and the tag "my dog and I" may be assigned to an image featuring both the user and a dog.

In an embodiment, S630 may include comparing the generated at least one signature to signatures of a plurality of multimedia content elements having assigned predetermined tags. In a further embodiment, tags of multimedia content elements having signatures that match one or more of the generated at least one signature may be generated as tags for the multimedia content element.

In another embodiment, the at least one tag may be generated based on metadata of concepts matching the at least one multimedia content element to be clustered. To this end, in a further embodiment, S630 may further include obtaining, from a DCC system (e.g., the DCC system 160, FIG. 1), at least one concept matching each multimedia content element to be clustered. In yet a further embodiment, S630 may further include querying the DCC system with respect to the signatures for each multimedia content element to be clustered.

At S640, at least one multimedia content element cluster is determined. Each determined multimedia content element cluster includes a plurality of multimedia content elements sharing a common concept. Each of the at least one multimedia content element also shares the common concept of the multimedia content element cluster. The common concept of a plurality of multimedia content elements may be a collection of signatures representing elements of the unstructured data and metadata describing the concept. The common concept may represent an item or aspect in the multimedia content element such as, but not limited to, an object, a person, an animal, a pattern, a color, a background, a character, a sub textual aspect, a meta aspect, words, sounds, voices, motions, combinations thereof, and the like. Multimedia content elements may share a common concept when each of the multimedia content elements is associated with at least one signature, at least one portion of a signature, at least one tag, or a combination thereof, that is common to all of the multimedia content elements sharing a common concept.

As noted above, in an embodiment, the common concept for each determined multimedia content element cluster is a personalized concept related to an interest of a user. For example, if a user interest is "theater," the determined at least one multimedia content element cluster includes a cluster with multimedia content elements having signatures indicating concepts such as "Broadway," "theater," and "plays," such as images and video showing theatrical performances and audio of songs from plays.

As non-limiting examples, the common concept may represent, e.g., a Labrador retriever dog shown in images or videos, a voice of the actor Daniel Radcliffe that can be heard in audio or videos, a motion including swinging of a baseball bat shown in videos, a subtext of playing chess, an indication that an image is a "selfie," and the like.

The common concept may be further based on levels of granularity. For example, the common concept may be related to cats generally such that any cats shown or heard in multimedia content elements is considered a common concept, or may be related to a particular cat such that only visual or audio representations of that cat are considered to be a common concept. Such granularity may depend on, e.g., a threshold for matching signatures, tags, or both, such that higher thresholds result in more granular results.

In another embodiment, the determined at least one multimedia content element may include only multimedia content elements of the same type as the obtained multimedia content element. For example, if the obtained multimedia content element is an image, only other images having a common concept may be determined. In yet another embodiment, multimedia content elements of different types may be determined. Which types of multimedia content elements may be determined may be based on, e.g., one or more rules.

As a non-limiting example of a common concept, for an image showing a person wearing a parachute with the sky in the background, a tag for the image may be "skydiving." The common concept may be the sub textual aspect "skydiving" indicating an activity that the person shown in the image is performing. Other multimedia content elements showing or otherwise illustrating people skydiving may also be associated with the tag "skydiving" and, therefore, the sub textual aspect "skydiving" is a common concept of the multimedia content elements.

As another non-limiting example of a common concept, for an audio clip in which a user recites information that the user wishes to reference later, a portion of a signature generated for the audio clip may be related to the meta aspect "note to self." In particular, a portion of the signature may be generated based on the words "note to self" spoken at the beginning of the audio clip. Other multimedia content elements may also have portions of signatures related to the concept "note to self" (e.g., other content illustrating the words "note to self" or similar phrases) and, therefore, the meta aspect "note to self" is a common concept of the multimedia content elements. In a further example, only multimedia content elements related to the particular user heard in the obtained multimedia content element (i.e., multimedia content elements featuring a voice of the user who recorded the obtained multimedia content element) may be determined as having a concept in common with the obtained multimedia content element such that the cluster includes only notes to self by the same user.

In an embodiment, if no existing multimedia content element clusters having a common concept with the multimedia content element can be found (e.g., if no multimedia content element clusters are associated with signatures or tags matching the generated at least one signature or the generated at least one tag above a predetermined threshold), S640 may include generating a new multimedia content element cluster. In a further embodiment, generating the new multimedia content element cluster may include searching in one or more data sources to identify multimedia content elements sharing a common concept with the obtained multimedia content element. The identified multimedia content elements may be clustered with the obtained multimedia content element.

At S650, each of the at least one multimedia content element sharing the common personalized concept with one of the determined at least one multimedia content element cluster is added to the respective determined multimedia content element cluster, thereby creating at least one personalized cluster. In an embodiment, S650 may further include storing the at least one personalized multimedia content element cluster in a storage (e.g., the database 150 of FIG. 1). As a non-limiting example, the personalized cluster may be stored in a server of a social media platform, thereby enabling other users to find the cluster during searches. Each cluster may be stored separately such that different groupings of multimedia content elements are stored in separate locations. For example, different clusters of multimedia content elements may be stored in different folders.

At S660, it is determined if additional multimedia content elements are to be clustered and, if so, execution continues with S605; otherwise, execution terminates.

Clustering of the multimedia content elements allows for organizing the multimedia content elements based on subject matter represented by various concepts. Such organization may be useful for, e.g., organizing photos captured by a user of a smart phone based on common subject matter. As a non-limiting example, images showing dogs, a football game, and food may be organized into different collections and, for example, stored in separate folders on the smart phone. Such organization may be particularly useful for social media or other content sharing applications, as multimedia content being shared can be organized and shared with respect to content. Additionally, such organization may be useful for subsequent retrieval, particularly when the organization is based on tags. As noted above, using signatures to classify the multimedia content elements typically results in more accurate identification of multimedia content elements sharing similar content. Further, by organizing multimedia content element based on subject matter known to be of interest to a user (e.g., as indicated in a user profile of the user), personalized clusters for the user may be created.

It should be noted that the embodiments described herein above with respect to FIG. 6 are discussed as including clustering multimedia content elements in series merely for simplicity purposes and without limitations on the disclosure. Multiple multimedia content elements may be clustered in parallel without departing from the scope of the disclosure. Further, the clustering method discussed above can be performed by the personalized clustering generator 130, or locally by a user device (e.g., the user device 110, FIG. 1).

Figure 7:
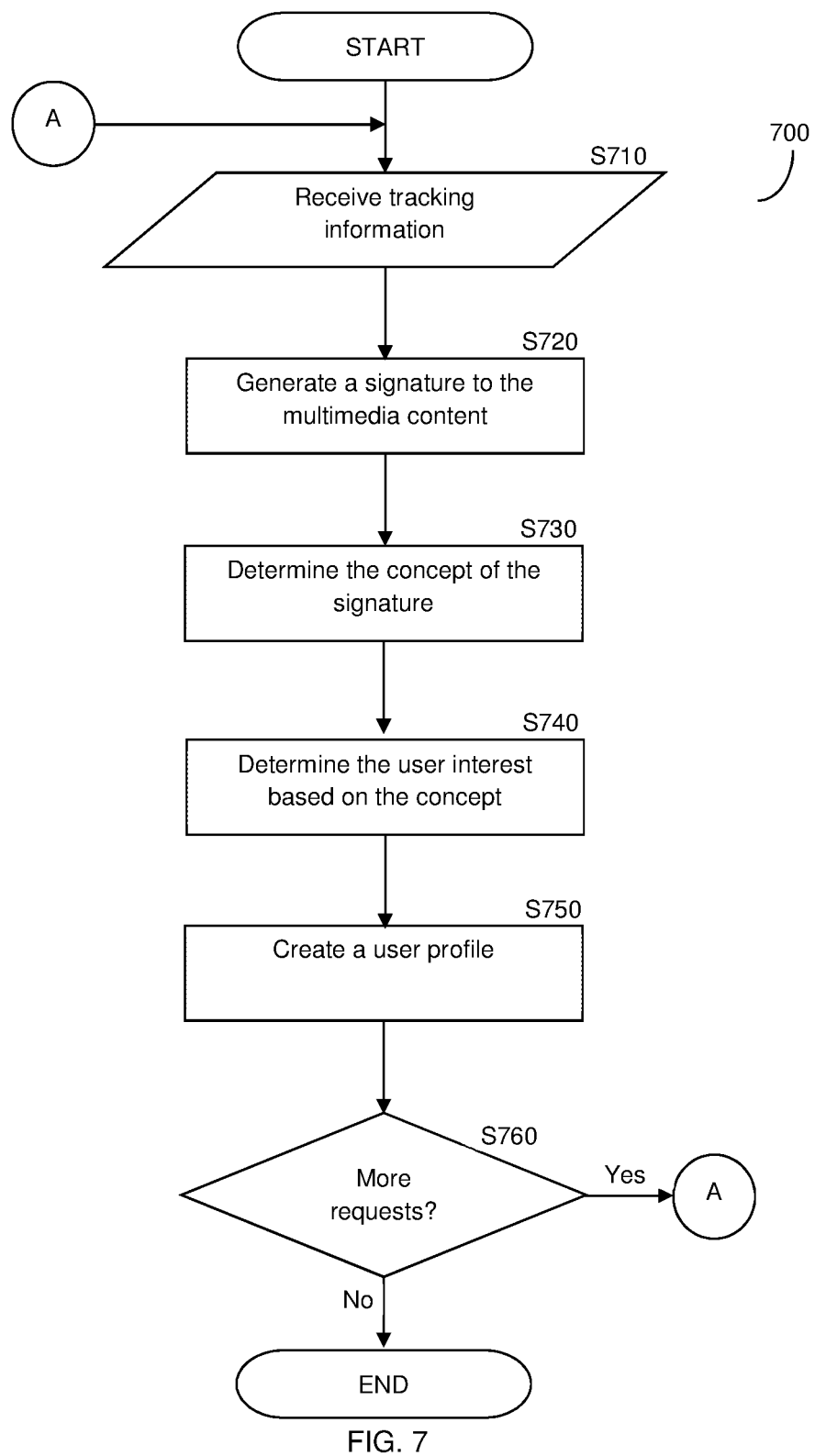
FIG. 7 is a flowchart illustrating a method for creating a user profile according to an embodiment.

FIG. 7 is an example flowchart 700 illustrating a method for profiling a user interest and creating a user profile based on an analysis of multimedia content elements according to an embodiment.

At S710, tracking information is received. According to this embodiment, the tracking information identifies multimedia elements (e.g., pictures, video clips, etc.) uploaded or viewed by the user from a web-browser (e.g., the app 115, FIG. 1) to one or more information sources. The information sources may include, but are not limited to, social networks, web blogs, news feeds, and the like. The social networks may include, for example, Google+®, Facebook®, Twitter®, Instagram®, and so on. The tracking information includes the actual uploaded content or a reference thereto. This information may also contain the name of each of the information sources, text entered by the user with the uploaded image, a unique identification code assigned to a user of the web browser, user actions with respect to viewed multimedia content elements, or a combination thereof.

At S720, at least one signature for each multimedia element identified in the tracking information is generated. The signatures for the multimedia content elements are typically generated by a SGS (e.g., the SGS 140, FIG. 1) as described hereinabove.

At S730, the concept of each of the at least one signature generated for each multimedia element is determined. In one embodiment, S730 includes querying a concept-based database using the generated signatures.

At S740, the user interest is determined based on the concept or concepts associated with the identified elements. According to an embodiment, if text is entered by the user and the text is included in the tracking information, the entered text is also processed to provide an indication of whether the element described a favorable interest.

At S750, a user profile is created and the determined user interest is saved in a data warehouse. It should be noted that if a user profile already exists in the data warehouse, the user profile is only updated to include the user interest determined at S740.

At S760, it is checked whether there are additional requests, and if so, execution continues with S710; otherwise, execution terminates.

As a non-limiting example for the process described in FIG. 7, a picture of a user riding a bicycle is uploaded to the user's profile page in Facebook®. The image is then analyzed and a signature is generated therefore. A comment made by the user stating: "I love those field trips" is identified. Based on analysis of the concept of the uploaded picture and the user's comment, the user profile is determined as positive for field trips. The user profile is then stored or updated (if, e.g., the user profile already existed prior to this example) in a data warehouse for further use.

According to an embodiment, in such cases where several elements are identified in the tracking information, a signature is generated for each of these elements and the context of the multimedia content (i.e., collection of elements) is determined respective thereto. An example technique for determining a context of multimedia elements based on signatures is described in detail in U.S. patent application Ser. No. 13/770,603, filed on Feb. 19, 2013, assigned to the common assignee, the contents of which are hereby incorporated by reference.

It should be noted that the method described with respect to FIG. 7 is merely an example for creating a user profile. Other methods for creating user profiles may be equally utilized without departing from the scope of the disclosure. Some methods for creating user profiles are described further in U.S. patent application Ser. No. 14/280,928, assigned to the common assignee, the contents of which are hereby incorporated by reference.

Figure 8:
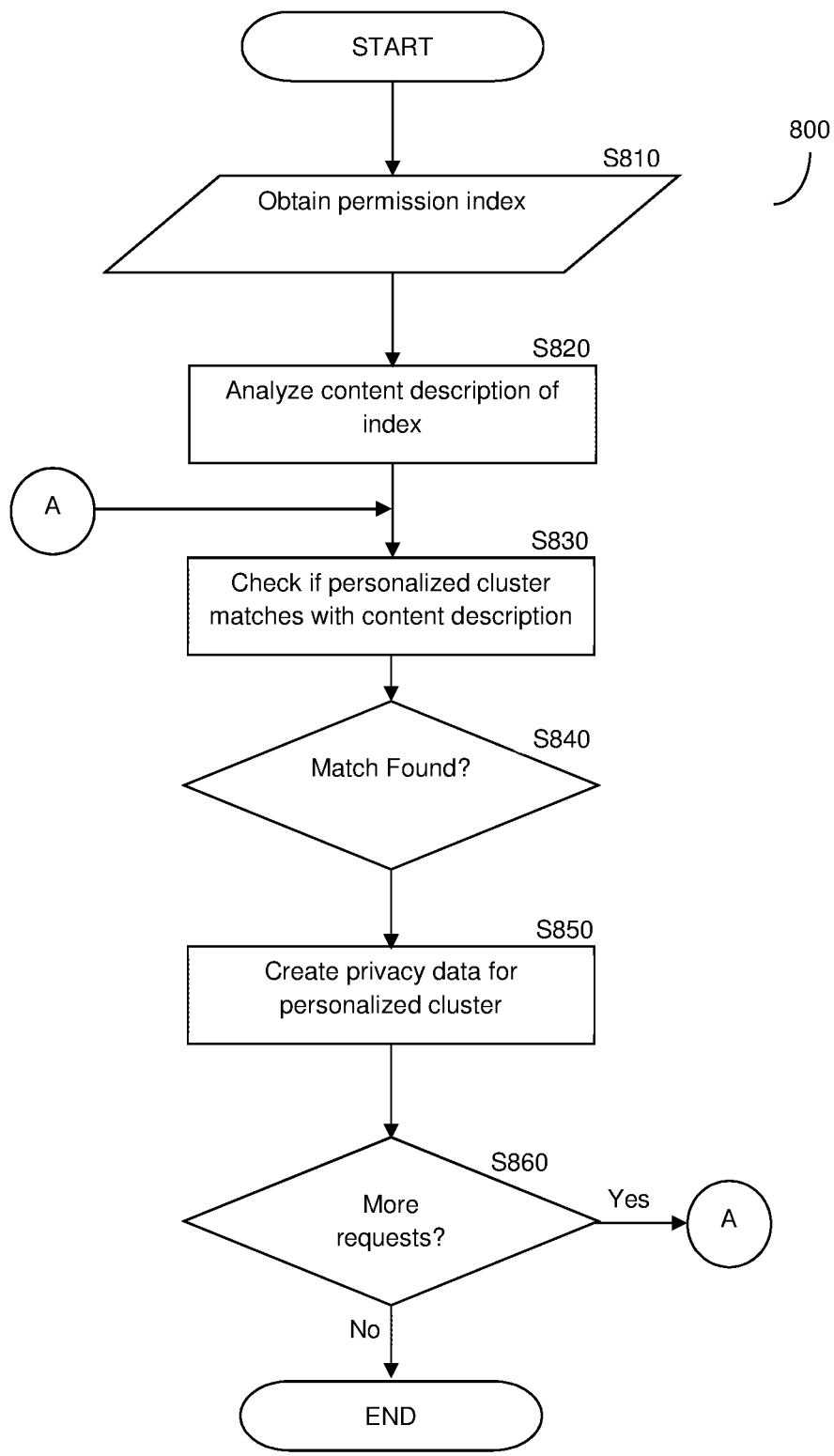
FIG. 8 is a flowchart illustrating a method for determining and enforcing access permissions to personalized clusters of MMCEs according to an embodiment.

FIG. 8 is an example flowchart 800 illustrating a method for determining and enforcing access permissions to personalized clusters of MMCEs according to an embodiment.

At S810, a permission index is obtained, for example, from a user device of a user. The content in the personalized clusters may be of or belong to the user. In an embodiment, the permission index is defined by the user. Alternatively or collectively, the permission index is generated or updated automatically based the user's profile. The permission index defines a general description of the content to be restricted and an authentication factor required to access the cluster.

At S820, content description in the index is analyzed. In one embodiment, the analysis may include textual analysis, e.g., determining meaningful words in the description. Alternatively or collectively, the analysis may include generating a unique signature, for example, using the signature generator.

At S830, each personalized cluster associated with the user is checked to determine if at least one cluster matches the content description in the index. In an embodiment, the matching is performed by the tag associated with the cluster and the description as analyzed at S820. In another embodiment, the check may be performed by comparing a signature representing the cluster and a signature generated for the content description in the index. Two signatures are considered to match if they overlap more than a predetermined (and configurable) threshold level.

At S840, it is determined if at least one match was found. If so, execution continues with S850; otherwise, execution proceeds with S860. At S850, privacy metadata is created for the personalized cluster. The privacy metadata includes the authentication factor determined for the content description matching the cluster. In an example embodiment, the authentication factor may include a single authentication factor using, e.g., a password, a biometric query, a voice recognition, a visual recognition a user's gesture. The authentication factor can be a 2 factor authentication. Enabling an access to the cluster, upon successfully authentication, may allow preforming the operations related to view, share, and/or copy one or more of the MMCEs in the cluster. The privacy metadata is associated with the generated cluster. At S855, the privacy metadata is associated with the respective personalized cluster.

At S860, it is checked if all the personalized clusters associated with the user have been checked. If so, execution ends; otherwise, execution returns to S830.

It should be noted that the privacy metadata determined the access permission to its respective personalized cluster. Thus, an enforcement of the access to a cluster is performed based on the privacy metadata. For example, if the privacy metadata requires a password, then only after providing the correct password, an access is granted. As noted above, an access to a cluster may include providing permissions to view, copy, and share MMCEs in the folder.

As non-limiting example, the permission index may be as demonstrated in Table 1:

TABLE 1

| Content Description | Authentication Factor |
| --- | --- |
| My picture | Password |
| Our baby | Password |

The content description can be matched to personalized clusters including the tags "me" and "Tommy First Day at School". The metadata privacy generated and associated with these clusters would require entering a valid password to access the content of these clusters.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a step in a method is described as including "at least one of A, B, and C," the step can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for determining access permissions to personalized clusters of multimedia content elements, comprising:
   generating personalized clusters of multimedia content elements;
   receiving a permission index designating at least the content description of at least one personalized cluster and an authentication factor;
   analyzing the content description;
     checking if there is at least one personalized cluster that matches the analyzed content description; and
   generating privacy metadata for each matching personalized cluster, wherein the privacy metadata includes at least the authentication factor associated with the respective content description matching the personalized cluster, wherein the generated privacy metadata determines access permission to the matching personalized cluster;
   wherein the generating of the personalized clusters of multimedia content elements comprises:
   determining, based on at least one user interest of a user, at least one personalized concept, wherein each personalized concept represents one of the at least one user interest;
   obtaining at least one multimedia content element related to the user;
   generating at least one signature for the obtained at least one multimedia content element, each generated signature representing at least a portion of the obtained at least one multimedia content element;
   determining, based on the generated at least one signature, at least one multimedia content element cluster, wherein each multimedia content element cluster includes a plurality of clustered multimedia content elements sharing a common concept, wherein each common concept is one of the determined at least one personalized concept; and
   creating at least one personalized multimedia content element cluster by adding to each determined cluster at least one of the obtained at least one multimedia content element sharing the common concept of the cluster.

2. The method of claim 1, further comprising: generating, based on the generated at least one signature, at least one tag for the obtained at least one multimedia content element, wherein the at least one multimedia content element cluster is determined based further on the generated at least one tag.

3. The method of claim 1, wherein each personalized concept is a collection of signatures representing a plurality of multimedia content elements and metadata describing the concept.

4. A system for determining access permissions to personalized clusters of multimedia content elements, comprising:
   a processing circuitry; and
   a memory, the memory containing instructions that, when executed by the processing circuitry, configure the system to:
   receive a permission index designating at least the content description of at least one personalized cluster and an authentication factor;
   analyze the content description;
   check if there is at least one personalized cluster that matches the analyzed content description; and
   generate privacy metadata for each matching personalized cluster, wherein the privacy metadata includes at least the authentication factor associated with the respective content description matching the personalized cluster, wherein the generate privacy metadata determines access permission to the matching personalized cluster;
   wherein the system is further configured to: determine, based on at least one user interest of a user, at least one personalized concept, wherein each personalized concept represents one of the at least one user interest;
   obtain at least one multimedia content element related to the user;
   generate at least one signature for the obtained at least one multimedia content element, each generated signature representing at least a portion of the obtained at least one multimedia content element;
   determine, based on the generated at least one signature, at least one multimedia content element cluster, wherein each multimedia content element cluster includes a plurality of clustered multimedia content elements sharing a common concept, wherein each common concept is one of the determined at least one personalized concept; and
   create at least one personalized multimedia content element cluster by adding to each determined cluster at least one of the obtained at least one multimedia content element sharing the common concept of the cluster.

5. The system of claim 4, wherein the system is further configured to: generate, based on the generated at least one signature, at least one tag for the obtained at least one multimedia content element, wherein the at least one multimedia content element cluster is determined based further on the generated at least one tag.

6. The system of claim 4, wherein each personalized concept is a collection of signatures representing a plurality of multimedia content elements and metadata describing the concept.

* * * * *